US006410130B1

(12) United States Patent
Schuhmacher et al.

(10) Patent No.: US 6,410,130 B1
(45) Date of Patent: Jun. 25, 2002

(54) COATINGS WITH A CHOLESTERIC EFFECT AND METHOD FOR THE PRODUCTION THEREOF

(75) Inventors: Peter Schuhmacher, Mannheim; Norbert Schneider, Altrip; Volker Richter, Heidelberg; Harald Keller; Peter Blaschka, both of Ludwigshafen; Günter Bettinger, Schifferstadt; Frank Meyer, Mannheim; Erich Beck, Ladenburg; Karl Siemensmeyer, Frankenthal; Helmut Steininger, Worms; Wolfgang Best, Freinsheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/486,695

(22) PCT Filed: Sep. 1, 1998

(86) PCT No.: PCT/EP98/05544

§ 371 (c)(1),
(2), (4) Date: Mar. 2, 2000

(87) PCT Pub. No.: WO99/11733

PCT Pub. Date: Mar. 11, 1999

(30) Foreign Application Priority Data

Sep. 2, 1997 (DE) .......................................... 197 38 369
Dec. 23, 1997 (DE) .......................................... 197 57 699

(51) Int. Cl.⁷ ................................................ B32B 5/16
(52) U.S. Cl. ........................ 428/327; 428/1.2; 428/402; 428/407; 428/207; 428/336; 252/299.01

(58) Field of Search .................... 428/1.2, 402, 407, 428/207, 327, 336; 252/299.01

(56) References Cited

U.S. PATENT DOCUMENTS 4,854,262 A    8/1989   Chino et al. ................. 118/411

(List continued on next page.)

FOREIGN PATENT DOCUMENTS

DE    196 29 761    6/1979

(List continued on next page.)

OTHER PUBLICATIONS

G. W. Gray, et al., Ellis Horwood Limited, vol. 1, 6 pages, "Liquid Crystals & Plastic Crystals", 1974 (Table of Contents only).

H. Basler, The Journal of Chemical Physics, vol. 52, No. 2, pp. 631 to 637, "Helical Twisting Power of Steroidal Solutes in Cholesteric Mesophases", Jan. 15, 1970.

H. Baessler, Festkörperprobleme XI, Advances in Solid State Physics, pp. 99 to 133, "Liquid Crystals", 1971.

*Primary Examiner*—Leszek Kiliman
(74) *Attorney, Agent, or Firm*—Oblon, Spivak, McClelland, Maier & Neustadt, P.C.

(57) ABSTRACT

Improved cholesteric special-effect layers are obtainable by comminuting cholesteric layers. These cholesteric layers are produced by applying at least one layer of a reactive, pourable cholesteric mixture to a moving substrate, by casting, and forming a solid cholesteric layer.

29 Claims, 2 Drawing Sheets

U.S. PATENT DOCUMENTS

Figure 1:
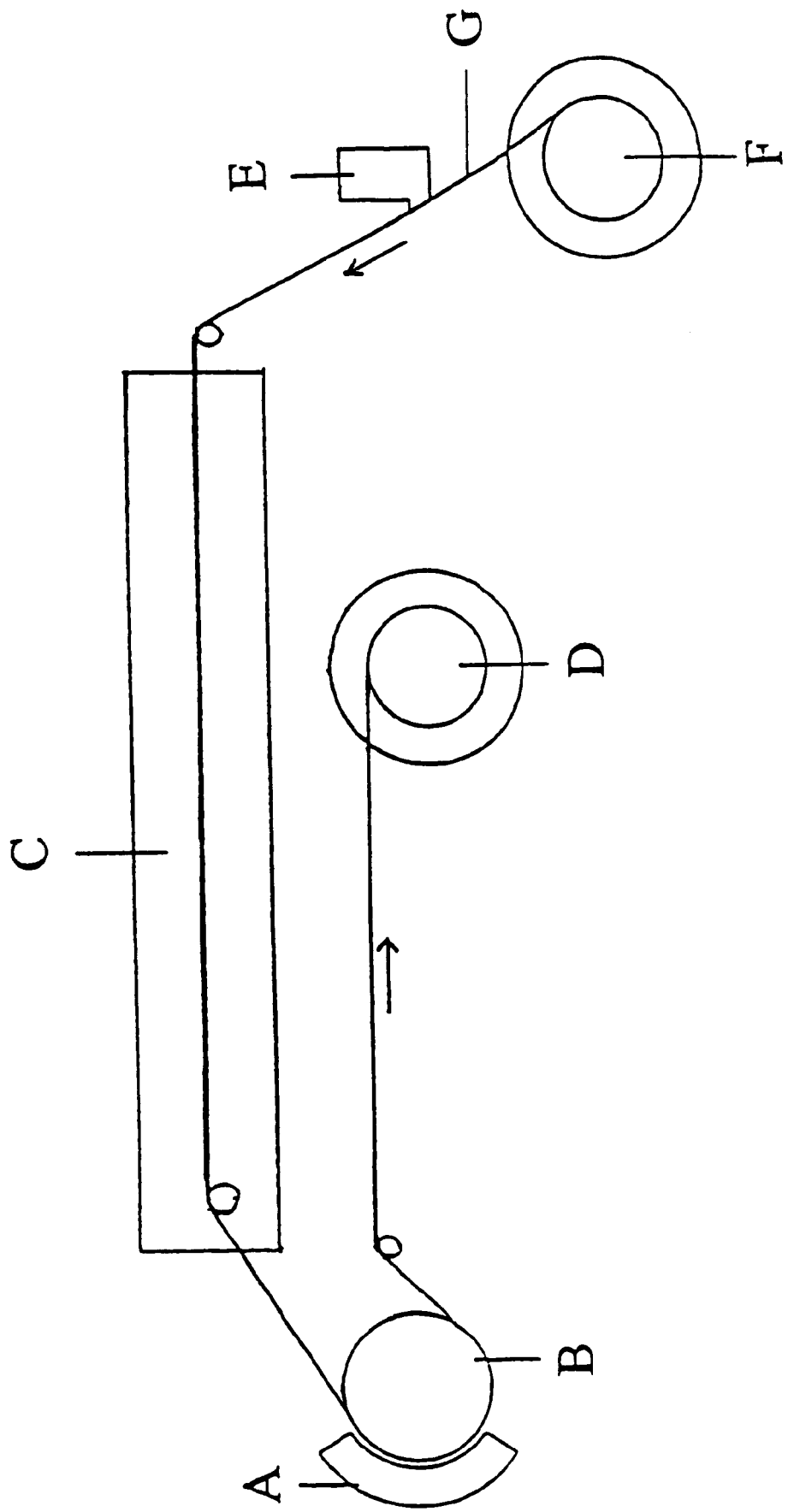

| | | | |
|---|---|---|---|
| 5,211,877 A | 5/1993 | Andrejewski et al. | 252/299.01 |
| 5,362,315 A | 11/1994 | Mueller-Rees et al. | 106/493 |
| 5,364,557 A | 11/1994 | Faris | 252/299.01 |
| 5,599,412 A | 2/1997 | Faris | 156/73.3 |
| 5,683,622 A | 11/1997 | Krätzschmar et al. | |
| 5,780,629 A | 7/1998 | Etzbach et al. | 544/296 |
| 5,788,880 A | 8/1998 | Schierlinger et al. | 252/299.61 |
| 5,827,449 A | 10/1998 | Hanelt et al. | 252/299.62 |
| 5,847,068 A | 12/1998 | Maxein et al. | 528/69 |
| 5,851,277 A | 12/1998 | Mueller-Rees et al. | 106/287.35 |
| 5,851,604 A * | 12/1998 | Müller-Rees | 428/1 |
| 5,858,097 A | 1/1999 | Richter et al. | 118/411 |
| 5,876,837 A | 3/1999 | Sailer et al. | 428/195 |
| 5,886,242 A | 3/1999 | Etzbach et al. | 585/25 |
| 5,922,465 A | 7/1999 | Gailberger et al. | |
| 5,942,030 A | 8/1999 | Schuhmacher et al. | |
| 5,976,239 A | 11/1999 | Dannenhauer et al. | 106/493 |

FOREIGN PATENT DOCUMENTS

| | | |
|---|---|---|
| DE | 37 33 031 | 4/1988 |
| DE | 42 40 743 | 6/1994 |
| DE | 43 42 280 | 6/1995 |
| DE | 195 32 408 | 9/1995 |
| DE | 44 16 191 | 11/1995 |
| DE | 44 18 076 | 11/1995 |
| DE | 195 02 413 | 8/1996 |
| DE | 195 04 930 | 8/1996 |
| DE | 195 41 820 | 5/1997 |
| DE | 196 39 165 | 6/1997 |
| DE | 196 39 179 | 6/1997 |
| DE | 196 39 229 | 6/1997 |
| DE | 96 02 848 | 7/1997 |
| DE | 196 02 795 | 7/1997 |
| DE | 196 19 460 | 11/1997 |
| DE | 19619973 | 11/1997 |
| DE | 196 31 658 | 2/1998 |
| DE | 197 04 506 | 8/1998 |
| DE | 197 13 638 | 10/1998 |
| DE | 197 17 371 | 10/1998 |
| EP | 0 032 710 | 7/1981 |
| EP | 358 208 | 3/1990 |
| EP | 0 383 376 | 8/1990 |
| EP | 0 452 959 | 10/1991 |
| EP | 0 431 630 | 12/1991 |
| EP | 0 685 749 | 12/1995 |
| EP | 686 674 | 12/1995 |
| GB | 2276883 | 10/1994 |
| GB | 2282145 | 3/1995 |
| WO | WO 94/22976 | 10/1994 |
| WO | WO 96/02597 | 2/1996 |
| WO | WO 97/00600 | 1/1997 |
| WO | WO 97/30136 | 8/1997 |

* cited by examiner

>| 100 μm |<

>| 100μm |<

COATINGS WITH A CHOLESTERIC EFFECT AND METHOD FOR THE PRODUCTION THEREOF

The invention relates to improved cholesteric special-effect layers, to processes for their preparation and to their use.

When substances exhibiting shape anisotropy are heated it is possible for liquid-crystalline phases known as mesophases to occur. The individual phases differ in the spatial arrangement of the centers of mass of the molecules, on the one hand, and by the arrangement of the molecules with respect to the long axes, on the other hand (G. W. Gray, P. A. Winsor, Liquid Crystals and Plastic Crystals, Ellis Horwood Limited, Chichester 1974). The nematic liquid-crystalline phase is distinguished by parallel orientation of the long axes of the molecules (one-dimensional order state). Provided that the molecules forming the nematic phase are chiral, the result is a chiral nematic (cholesteric) phase in which the long axes of the molecules form a helical superstructure perpendicular thereto (H. Baessler, Festkörperprobleme XI, 1971). The chiral moiety may be present in the liquid-crystalline molecule itself or else may be added as a dopant to the nematic phase, inducing the chiral nematic phase. This phenomenon was first investigated on cholesterol derivatives (eg. H. Baessler, M. M. Labes, *J. Chem. Phys.* 52, (1970) 631).

The chiral nematic phase has special optical properties: a high optical rotation and a pronounced circular dichroism resulting from selective reflection of circularly polarized light within the chiral nematic layer. Depending on the pitch of the helical superstructure different colors can be generated, which can appear different according to the angle of view. The pitch of the helical superstructure is in turn dependent on the twisting power of the chiral component. In this case it is possible, in particular by altering the concentration of a chiral dopant, to vary the pitch and hence the wavelength range of the selectively reflected light of a chiral nematic layer. Chiral nematic systems of this type have interesting possibilities for practical use.

Cholesteric special-effect pigment layers and the pigments prepared therefrom are known.

EP-A-686 674 and its parent DE-A-44 16 191 describe interference pigments comprising molecules which are fixed in a cholesteric arrangement; the pigments feature a platelet-shaped structure and have, as one example demonstrates, a layer thickness of 7 μm. The pigments are prepared by applying highly viscous LC material to a substrate, the substrate being conveyed at a speed of about 2 m/min below a fixed doctor blade. By this means the liquid-crystalline molecules are oriented.

DE-A-196 39 179 discloses transparent compositions which comprise pigments whose coloredness is dependent on the viewing angle. The compositions are said to contain absorptive colorants in an amount such that the angle-dependent color effect which occurs in the specular-angle configuration is intensified without any definite adverse effect on the transparency of the composition under all other angular configurations. The pigments are prepared as described in the abovementioned EP-A-686 674.

DE-A-196 39 229 discloses a composition in which at least one matrix, containing pigments whose coloredness is dependent on the viewing angle, is present in a two- or three-dimensionally structured format in the form of structural elements in at least one further matrix. These matrices 1 and 2 are non-identical, or contain non-identical pigments in identical concentrations. The pigments are prepared as described in the abovementioned EP-A-686 674.

DE-A-196 39 165 describes a method of obtaining new color effects by means of pigments whose coloredness depends on the viewing angle, in a matrix, where following their incorporation into the matrix the pigments are subjected to three- and/or two-dimensionally selective tilting in the matrix. The pigments are tilted preferably by means of differently directed movement of the pigments in the matrix or by using pigments differing in their concentration in the matrix. The pigments are prepared as described in the abovementioned EP-A-686 674.

DE-A-195 02 413 describes a pigment whose coloredness is dependent on the viewing angle and which has been obtained by three-dimensional crosslinking of oriented substances of liquid-crystalline structure with a chiral phase. In order to render such pigment colorfast with respect to elevated temperatures, it is proposed to conduct crosslinking in the presence of at least one additional, color-neutral compound which contains at least two crosslinkable double bonds. The uncrosslinked cholesteric mixture is applied by knife coating onto a film, for example. No details are given regarding the thickness of the layer applied by knife coating.

U.S. Pat. No. 5,364,557 describes cholesteric inks, for drawing and printing, which comprise platelet-shaped or flakelike cholesteric pigments. The pigments are prepared by coating a conveyor belt with a cholesteric melt and then smoothing and aligning the cholesteric film by means of a blade. This alignment step is described as being essential to the implementation of the invention. The pigments can comprise two layers of different handedness or two layers of identical handedness with a further layer between them which inverts the direction of rotation of circularly polarized light. No light-absorbing layer is mentioned.

U.S. Pat. No. 5,599,412 discloses a preparation process and apparatus for preparing cholesteric inks for writing and printing. Application and alignment of the melted polymer take place as described in the above-cited U.S. Pat. No. 5,364,557.

DE-A-44 18 076 describes effect coating materials and effect finishes which comprise interference pigments formed from esterified cellulose ethers. Using these interference pigments it is possible, it is said, to produce, in the case of the coating material, color changes which are dependent on the direction of incident light and on the direction of viewing, or to produce particularly intense shades of hitherto unknown brilliance on the article coated with such a material. The pigments are prepared by comminuting cholesteric layers which after curing are said to have a thickness of 5 to 200 μm. The layers are applied, for example, by knife coating. In the examples, a layer thickness of approximately 10 μm is stated.

DE-A-196 297 61 describes cosmetic or pharmaceutical formulations which comprise pigments whose coloredness is dependent on the viewing angle. The pigments comprise at least one oriented crosslinked substance with a liquid-crystalline structure and with a chiral phase. The pigments are plateletlike in form and have a thickness of 1 to 20 μm. Preparation of the pigments is as described in the abovementioned EP-A-686 674, although the layer thickness is said to be 5 μm rather than 7 μm.

Known from WO 96/02597 is a method of coating or printing substrates with a composition that comprises a chiral liquid or achiral, liquid-crystalline monomer and a non-liquid-crystalline, chiral compound. The liquid-crystalline monomers are preferably photochemically polymerizable bisacrylates. To achieve the uniform orientation of the cholesteric phase, which is required for the development of the desired optical properties, and to achieve it even on large surfaces of complex form, it is necessary to add a polymeric binder. The layers, about whose thickness nothing is stated, are prepared via various printing techniques or by spraying. Application by means of a casting slot is mentioned as a possibility but is exemplified in none of the 33 examples.

DE-A-196 02 795 discloses a process for preparing pigment particles. The pigment particles have a substantially uniform, defined form and size, being prepared either by polymerizing a polymerizable mixture in uniformly dimensioned recesses or by initial shaping, by means of a printing process, and subsequent polymerization. The layer thickness of the pigments is not mentioned. Particular emphasis is placed on the importance of the use of polymeric binders, and/or of monomeric compounds which can be converted by polymerization into a polymeric binder, for improving the flow viscosity.

DE-A-196 02 848 describes a process for preparing pigments which employs a polymerizable mixture necessarily comprising, inter alia, a polymeric binder and/or monomeric compounds which can be converted by polymerization into a polymeric binder, and/or comprising a dispersing auxiliary. These auxiliaries are said to bring about a considerable improvement in the flow viscosity.

DE-A-42 40 743 discloses pigments whose coloredness is dependent on the viewing angle. The pigments are preferably prepared from three-dimensionally crosslinkable polyorganosiloxanes, the liquid-crystal mass being knifecoated onto a metal, plastic or glass substrate, crosslinked thermally or photochemically, and then the crosslinking product being detached from the substrate. The pigments preferably have a thickness of from 5 to 50 $\mu$m.

EP-B-383 376 describes liquid-crystal pigments comprising platelet-shaped particles some of which at least are coated with liquid-crystalline material. Coating takes place by dispersing the platelet-shaped particles in a solvent in which liquid- crystalline material has been dissolved, and then precipitating at least some of the liquid-crystalline material onto the particles. Uniform cholesteric layers arranged exactly parallel to the middle layer cannot be prepared by this process. The pigments are apparently not fully hiding, since they are said to be applied preferably to black surfaces.

The processes described above for preparing cholesteric layers possess the serious disadvantage that the rates of application which can be achieved with them are very low. This renders virtually impossible the preparation of cholesteric layers, for example, for effect films or special-effect pigments on the industrial scale. The cholesteric pigments which can be prepared with the aid of known processes likewise possess a range of disadvantages. Pigments of layer thickness <5 $\mu$m cannot be prepared, and in addition there is an unsatisfactorily high fluctuation in the layer thickness. This also has an adverse effect on the desired optical properties, such as gloss and intensity of color. Moreover, the application of two or more cholesteric layers over one another is not possible to a satisfactory extent, since multilayer special-effect pigments or films produced in this way would be too thick and hence would have poor processing properties.

DE-A-196 19 973 outlines, in a non-imitable manner, an idea for two- or three-layer platelet-shaped interference pigments. The pigments are intended to have at least one layer which consists of liquid-crystalline polymers whose mesogens are at least approximately in chiral-nematic and/or smectic and/or cholesteric order. Also provided in the interference pigments is a light-absorbing layer which is absorbent for at least part of the visible spectrum of light. The pigments are to be obtainable by knifecoating, rolling or spray application to a smooth substrate, curing of the thin film thus produced, application of the light-absorbing layer, curing of this light-absorbing layer, optional application and curing of a further film which coincides with the first film in its composition and layer thickness, and removal and comminution of the cured layer assembly. Specific pigments, however, are not disclosed. As far as the material composition of the pigments is concerned, all that is said is that "liquid-crystalline main-chain or side-chain polymers or mixtures thereof, liquid-crystalline oligomers or oligomer mixtures, or liquid-crystalline monomers or monomer mixtures [come] into consideration" as liquid-crystalline polymers. There are no examples regarding the preparation of the pigments or the pigment-containing coating formulations. The disclosure content of DE-A-196 19 973 is therefore limited to purely theoretical discussions of the idea of two- or three-layer pigments. Consequently, no technical teaching is provided that is imitable by the skilled worker.

WO 94/22976 and its parent GB-A-2 276 883 describe two-layer cholesteric pigments based on two different polyorganosiloxanes from the company Wacker. The pigments are prepared in an extremely complex manner by separate coating of two previously nylon-coated glass plates with solutions of the abovementioned liquid crystals; rubbing of each liquid-crystal layer in order to orient it; attachment of thermally deformable spacers to the glass plates; placing of the glass plates together with cholesteric layers facing one another, and uniting of the cholesteric layers by thermal deformation of the spacers at elevated temperature in a vacuum, and also crosslinking of the united cholesteric layers. The film thus obtainable is said, like the pigments obtainable from it by milling, to have a thickness of approximately 10 $\mu$m. Despite the prior coating of the glass plates with nylon, detachment of the film from the glass plates is apparently incomplete, so that residues of the film have to be scratched off in order to obtain the pigments from the plates, which makes the preparation of the pigments even more complex. The idea of three-layer pigments is merely outlined. These pigments cannot be prepared by the preparation process described for two-layer pigments. WO 94/22976 and its parent GB-A-2 276 883 therefore provide no technical teaching which is imitable by the skilled worker and which would in any way provide three-layer pigments. The disclosure content is limited to purely theoretical discussions of the structure of three-layer pigments.

For use in automotive finishes, in particular, there is a desire for pigments having a diameter of from about 20 to 30 $\mu$m. In order that they can be correctly oriented in a coating, for example, the pigments should have a thickness to length ratio of approximately 1:5. Hence with known processes it is possible only to prepare multilayer pigments with diameters of about 70 $\mu$m, which are too large for many applications. Even the preparation of pigments with diameters of $\leq$30 $\mu$m is problematic.

In order to absorb the transmitting wavelength range, the interference pigments prepared by known processes must either contain additional pigments in the cholesteric matrix or be applied to a colored substrate. When foreign pigments are incorporated into the liquid-crystalline mass it is disadvantageous that a considerable portion of the reflecting wavelength range is absorbed or scattered owing to absorption and scattered light, so that the special advantage of the interference pigments on a cholesteric basis is largely removed. The same problem occurs if cholesteric pigments are mixed with absorbing pigments into coating formulations. Reflections which disrupt the perceived color can only be avoided if the absorbing pigment is dispersed very finely into the cholesteric matrix. From general experience this is only the case if the pigment is dispersed using additives tailored specifically to the pigment surface. These compounds, such as fatty acids, salts of fatty acids, soya lecithins or phosphates, however, interfere with the development of the helical orientation and thus prevent optimum color development. If, on the other hand, absorption takes place over a colored underlayer, the background must be of uniformly high quality in order to provide the desired overall impression of the effect coating. Consequently, considerable effort has to be expended on pretreating the background. An ideal background for maximum brilliance would have to be black or have specular gloss, which in the case of car bodies, for example, would be extremely difficult to realize.

It is an object of the present invention to provide special-effect pigments and effect films which no longer have the above-described disadvantages of the prior art. A further object of the present invention is to provide an improved process for preparing cholesteric layers.

We have found that this object is achieved if, in contrast to the prior art, cholesteric layers are prepared using a cholesteric mixture which has been rendered pourable by, for example, dilution.

The present invention consequently provides a process for producing cholesteric layers, which comprises applying at least one layer of a reactive, pourable, cholesteric mixture to a preferably moving substrate, preferably by casting, and forming a solid cholesteric layer. The reactive, pourable cholesteric mixture is preferably applied in the isotropic phase. In a preferred embodiment, the reactive, pourable cholesteric mixture is diluted before casting and the solid cholesteric layer is formed with or without (i.e. during or after) the removal of the diluent. Formation of the solid cholesteric layer can take place by crosslinking, by polymerization or by rapid cooling to below the glass transition temperature (freezing-in of the cholesteric phase), where for the purposes of the present invention crosslinking means the covalent linking of polymeric compounds and polymerization means the covalent linking of monomeric compounds to form polymers. By curing is meant crosslinking, polymerization or the freezing-in of the cholesteric phase. For the purposes of the present invention, a mixture is dubbed reactive if at least one compound present in the mixture is capable of forming covalent linkages.

The moving substrate is preferably in strip form and consists, for example, of a metal, paper or polymer-film web.

The production of cholesteric layers in accordance with the invention, which layers can in turn be used to produce effect films and special-effect pigments, offers a range of surprising advantages:

a) In contrast to assumptions to date the cholesteric helices can be oriented with particular advantage when dilute cholesteric solutions are used. Contrary to general expectations, a particularly uniform alignment of the helices is observed in the layers produced in accordance with the invention.

b) Post-orientation of the cast (as yet unpolymerized and uncrosslinked) layer in order to align the cholesterics is unnecessary.

c) The cholesteric layers produced possess an extremely homogeneous layer thickness.

d) Extremely thin cholesteric layers can be produced in a reproducible manner.

e) The cholesteric layers produced are extremely smooth, and hence highly lustrous, on both sides.

f) Color brilliance and luster of the effect films and special-effect pigments produced therewith are markedly improved over the prior art.

g) Cost-effective production of special-effect pigments and effect films, and their use in volume production of consumer goods, such as motor vehicles, for example, are made possible for the first time.

h) Brilliant multilayer special-effect pigments having a diameter of $\leq 30$ $\mu$m, in particular $\leq 20$ $\mu$m, as are required for automotive finishes for example, can be produced in a reproducible manner.

i) The perceived color of the cured cholesteric layer is largely independent of external stimuli; in other words, it is stable over a wide range of temperature and pressure.

The cholesteric mixture is preferably applied with a diluent fraction of from about 5 to 95% by weight, in particular from about 30 to 80% by weight, preferably from about 40 to 70% by weight and, with particular preference, from about 55 to 60% by weight, based in each case on the overall weight of the mixture that is to be applied.

It is preferred in the process of the invention to employ a pourable, reactive cholesteric mixture which is selected from mixtures comprising:

a) at least one cholesteric, polymerizable monomer in an inert diluent; or b) at least one achiral, nematic, polymerizable monomer and one chiral compound in an inert diluent; or c) at least one cholesteric, crosslinkable oligomer or polymer in an inert diluent; or d) a cholesteric polymer in a polymerizable diluent; or e) at least one cholesteric polymer whose cholesteric phase can be frozen in by rapid cooling to below the glass transition temperature.

Preferred monomers of group a) are described in DE-A-196 02 848, the full content of which is incorporated herein by reference. In particular, the monomers a) embrace at least one chiral, liquid-crystalline, polymerizable monomer of the formula I

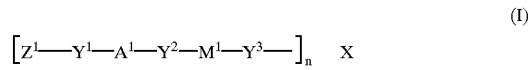

where $Z^1$ is a polymerizable group or a radical which carries a polymerizable group, $Y^1$, $Y^2$, $Y^3$ independently are chemical bonds, oxygen, sulfur,

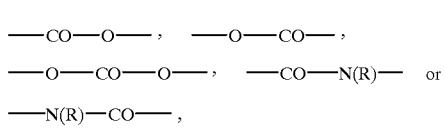

$A^1$ is a spacer, $M^1$ is a mesogenic group,

X is an n-valent chiral radical,

R is hydrogen or $C_1$–$C_4$-alkyl, n is 1 to 6, and $Z^1$, $Y^1$, $Y^2$, $Y^3$, $A^1$ and $M^1$ can be identical or different if n is greater than 1.

Preferred radicals $z^1$ are:

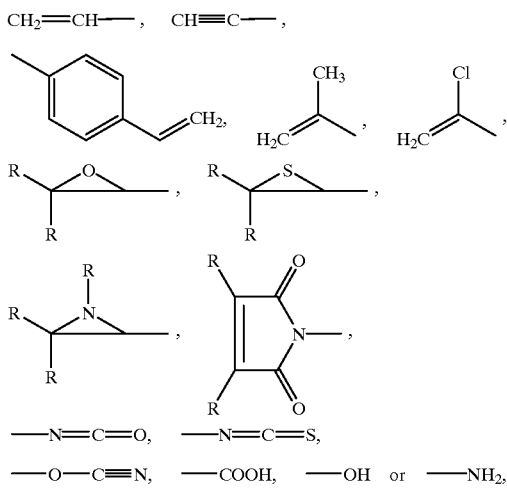

—N=C=O, —N=C=S,

—O—C≡N, —COOH, —OH or —NH$_2$, where each R can be identical or different and is hydrogen or $C_1$–$C_4$-alkyl, such as methyl, ethyl, n-propyl, isopropyl, n-butyl, isobutyl, sec-butyl or tert-butyl. Of the reactive polymerizable groups, the cyanates are able to trimerize spontaneously to cyanurates and are therefore preferred. Polymerization of the other groups indicated requires further compounds having complementary reactive groups. Isocyanates, for example, are able to polymerize with alcohols to give urethanes and with amines to give urea derivatives. Similar comments apply to thiiranes and aziridines. Carboxyl groups can be condensed to give polyesters and polyamides. The maleimido group is particularly suitable for free-radical copolymerization with olefinic compounds such as styrene. Said complementary reactive groups can be present either in a second compound of the invention, which is mixed with the first, or can be incorporated into the polymeric network by means of auxiliary compounds containing 2 or more such complementary groups.

Particularly preferred groups $Z^1$—$Y^1$ are acrylate and methacrylate. $Y^1$–$Y^3$ can be as defined above, the term a chemical bond meaning a single covalent bond.

Suitable spacers $A^1$ are all groups known for this purpose. The spacers contain generally 1 or more, e.g. from 2 to 30, preferably 1 to 12 or 2 to 12 carbon atoms and consist of linear aliphatic groups. They may be interrupted in the chain by nonadjacent O, S, NH or NCH$_3$, for example. Other suitable substituents for the spacer chain are fluorine, chlorine, bromine, cyano, methyl and ethyl.

Examples of representative spacers are:

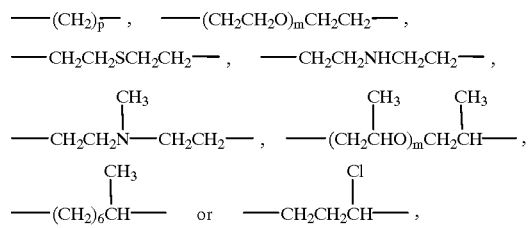

where
m is 1 to 3 and
is 1 to 12.
The mesogenic group $M^1$ preferably has the structure (T—$Y^8$)$_s$—T where $Y^8$ is a bridge in accordance with one of the definitions of $Y^1$, s is 1 to 3 and T is identical or different at each occurrence and is a divalent isocycloaliphatic, heterocycloaliphatic, isoaromatic or heteroaromatic radical.

The radicals T can also be ring systems substituted by $C_1$–$C_4$-alkyl, fluorine, chlorine, bromine, cyano, hydroxyl or nitro. Preferred radicals T are:

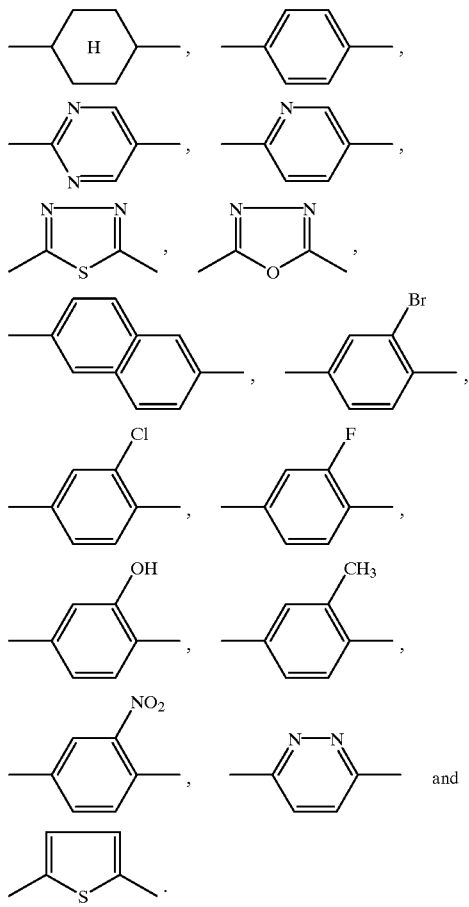

and

Particular preference is given to the following mesogenic groups $M^1$:

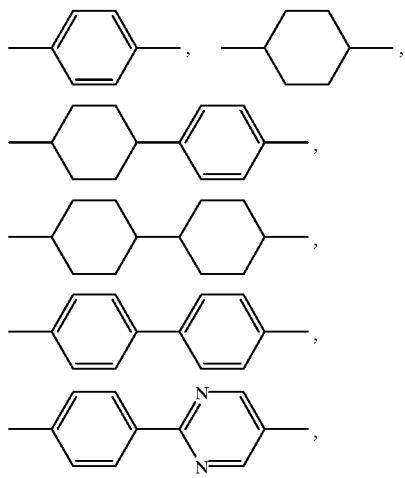

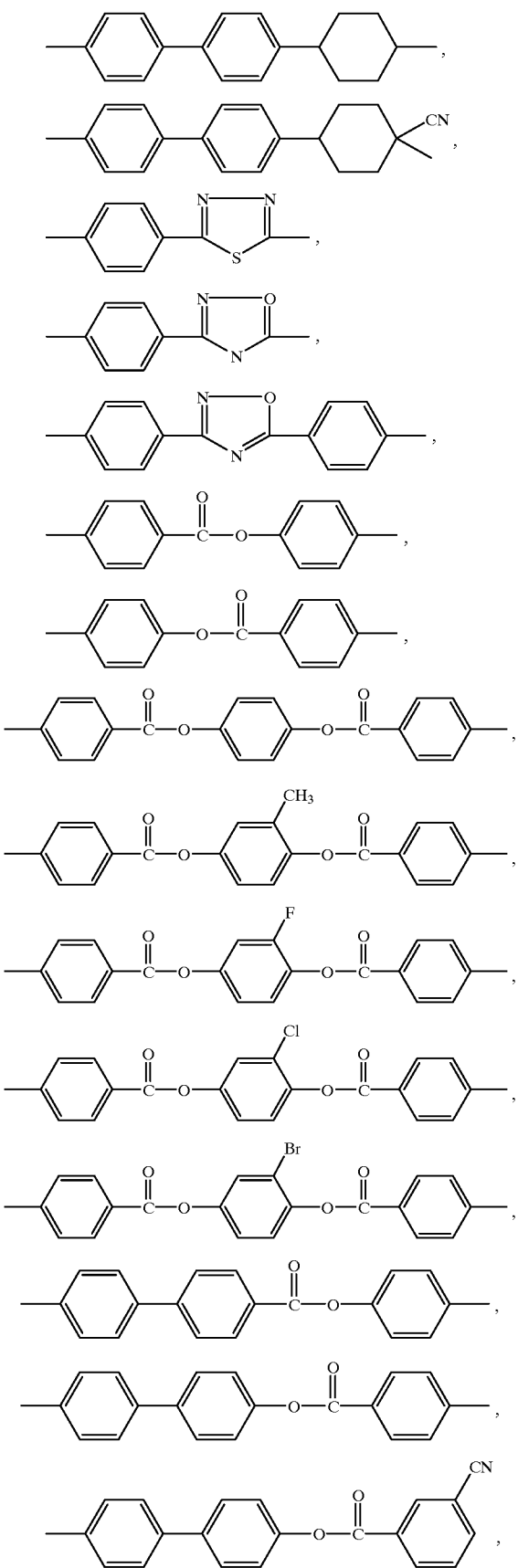

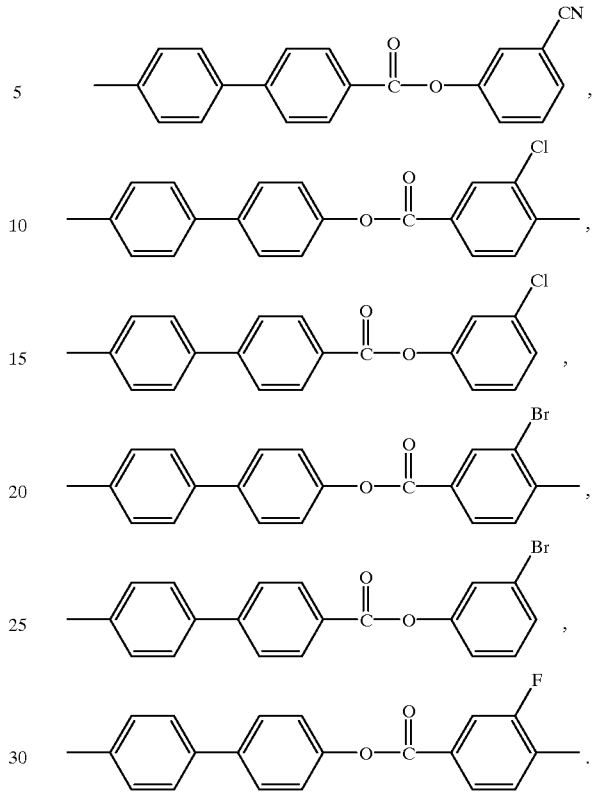

Of the chiral radicals X of the compounds of the formula I particular preference is given, not least on account of their availability, to those derived from sugars, from binaphthyl or biphenyl derivatives and from optically active glycols, dialcohols or amino acids. In the case of the sugars, particular mention should be made of pentoses and hexoses and derivatives thereof.

Examples of radicals X are the following structures, the lines at the end in each case denoting the free valences.

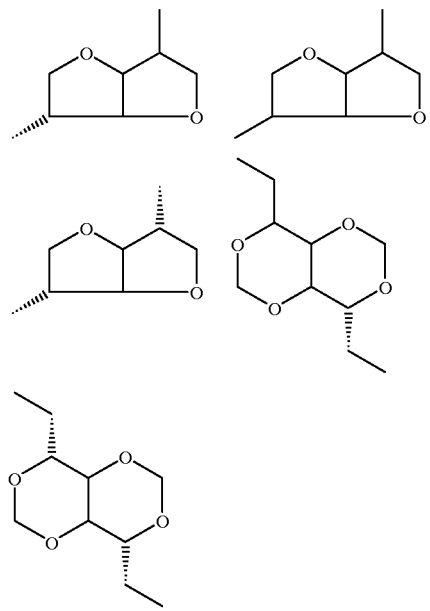

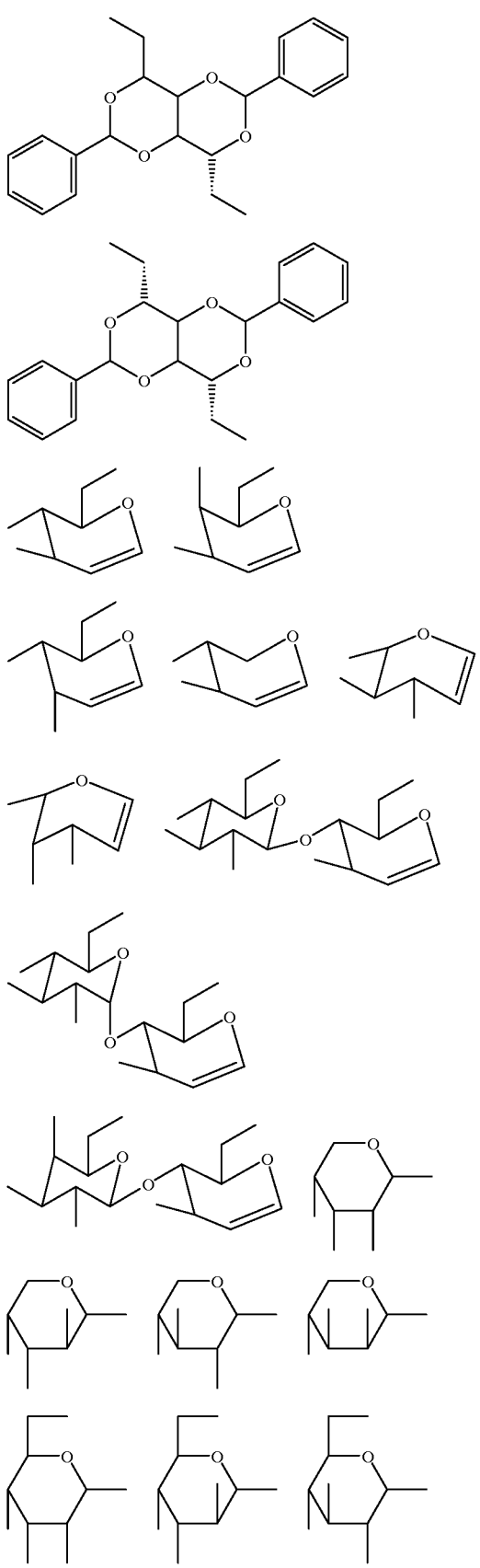

-continued

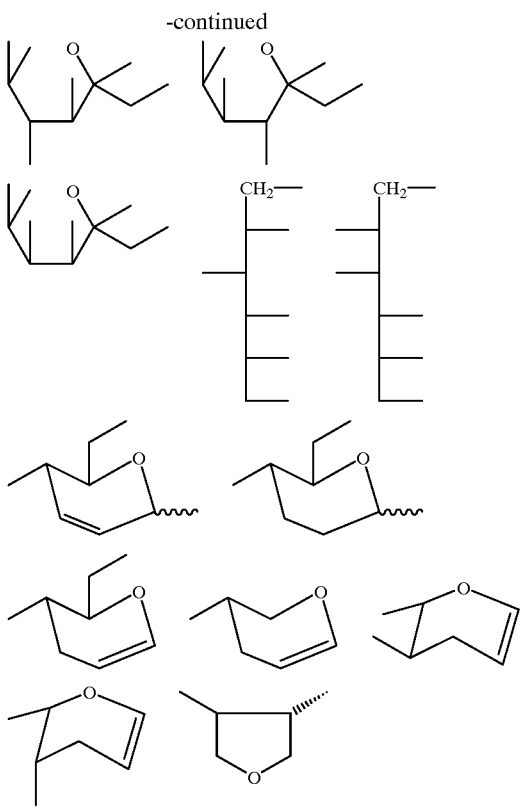

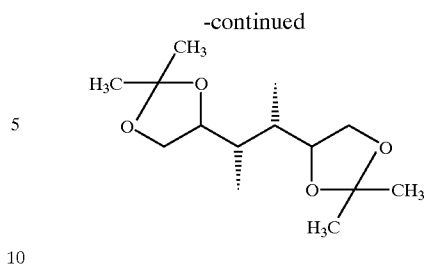

Further examples are set out in the German Application P 43 42 280.2.

n is preferably 2.

As preferred monomers of group b), the polymerizable mixture in the process of the invention includes at least one achiral liquid-crystalline polymerizable monomer of the formula II $$Z^2-Y^4-A^2-Y^5-M^2-Y^6-A^3-(Y^7-Z^3)_n \qquad (II)$$

where $Z^2$, $Z^3$ are identical or different polymerizable groups or radicals which contain a polymerizable group, n is 0 or 1

$Y^4$, $Y^5$, $Y^6$, $Y^7$ independently are chemical bonds, oxygen, sulfur,

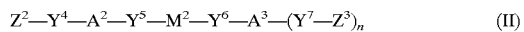

, , $A^2$, $A^3$ are identical or different spacers and $M^2$ is a mesogenic group.

The polymerizable groups, bridges $Y^4$ to $Y^7$, the spacers and the mesogenic groups are subject to the same preferences as the corresponding variables of the formula I.

In addition, the mixture according to b) includes a chiral compound. The chiral compound brings about the twisting of the achiral liquid-crystalline phase to form a cholesteric phase. In this context, the extent of twisting depends on the twisting power of the chiral dopant and on its concentration. Consequently, therefore, the pitch of the helix and, in turn, the interference color depend on the concentration of the chiral dopant. As a result, it is not possible to indicate a generally valid concentration range for the dopant. The dopant is added in the amount at which the desired color effect is produced.

Preferred chiral compounds are those of the formula Ia $$[Z^1-Y^1-A^1-Y^2-M^a-Y^3-]_n \ X, \qquad (Ia)$$

where $Z^1$, $Y^1$, $Y^2$, $Y^3$, $A^1$, X and n are as defined above and $M^a$ is a divalent radical which comprises at least one heterocyclic or isocyclic ring system.

The moiety $M^a$ here is similar to the mesogenic groups described, since in this way particularly good compatibility with the liquid-crystalline compound is achieved. Ma, however, need not be mesogenic, since the compound Ia is intended merely by virtue of its chiral structure to bring about the appropriate twisting of the liquid-crystalline phase. Preferred ring systems present in $M^a$ are the above-mentioned structures T, preferred structures $M^a$ being those Particular preference is given to

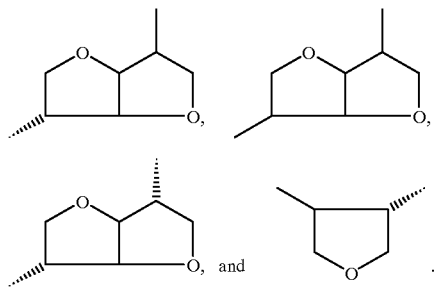

Also suitable, furthermore, are chiral groups having the following structures:

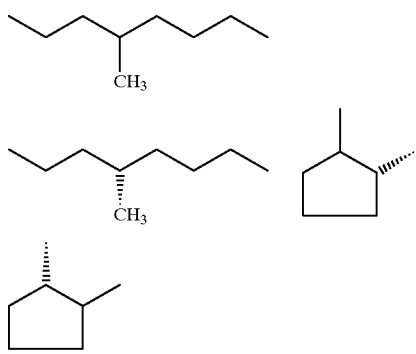

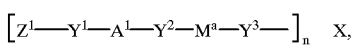

of the abovementioned formula $(T—Y^8)_s—T$. Further monomers and chiral compounds of group b) are described in WO 97/00600 and its parent DE-A-195 324 08, the full content of which is expressly incorporated herein by reference.

Preferred polymers of group c) are cholesteric cellulose derivatives as described in DE-A-197 136 38, especially cholesteric mixed esters of (VI) hydroxyalkyl ethers of cellulose with (VII) saturated, aliphatic or aromatic carboxylic acids and (VIII) unsaturated mono- or dicarboxylic acids.

Particular preference is given to mixed esters in which the hydroxyalkyl radicals of component VI that are attached by way of ether functions are straight-chain or branched $C_2$–$C_{10}$-hydroxyalkyl radicals, especially hydroxypropyl and/or hydroxyethyl radicals. Component VI of the mixed esters of the invention preferably has a molecular weight of from about 500 to about 1 million. Preferably, the anhydroglucose units of the cellulose are etherified with hydroxyalkyl radicals in an average molar degree of substitution of from 2 to 4. The hydroxyalkyl groups in the cellulose can be identical or different. Up to 50% of them can also be replaced by alkyl groups (especially $C_1$–$C_{10}$-alkyl groups). One example of such a compound is hydroxypropylmethylcellulose.

Compounds which can be used as component VII of the mixed esters that are employable are straight-chain aliphatic $C_1$–$C_{10}$ carboxylic acids, especially $C_2$–$C_6$ carboxylic acids, branched aliphatic $C_4$–$C_{10}$ carboxylic acids, especially $C_4$–$C_6$ carboxylic acids, or straight-chain or branched halocarboxylic acids. Component VII can also comprise benzoic acid or aliphatic carboxylic acids with aromatic substituents, especially phenylacetic acid. Component VII is with particular preference selected from acetic, propionic, n-butyric, isobutyric and n-valeric acid, in particular from propionic, 3-chloropropionic, n-butyric and isobutyric acid.

Component VIII is preferably selected from unsaturated $C_3$–$C_{12}$ mono- or dicarboxylic acids or monoesters of such dicarboxylic acids, especially from α,β-ethylenically unsaturated $C_3$–$C_6$ mono- or dicarboxylic acids or monoesters of the dicarboxylic acids.

Component VIII of the mixed esters that are employable is with particular preference selected from acrylic, methacrylic, crotonic, vinylacetic, maleic, fumaric and undecenoic acid, especially from acrylic and methacrylic acid.

Component VI is preferably esterified with component VII and VIII in an average molar degree of substitution of from 1.5 to 3, in particular from 1.6 to 2.7 and with particular preference, from 2.3 to 2.6. Preferably about 1 to 30%, in particular from 1 to 20% or 1 to 10%, with particular preference, from about 5 to 7% of the OH groups of component VI are esterified with component VIII.

The proportion of component VII to component VIII determines the hue of the polymer.

Highly suitable polymers of group c), moreover, are the propargyl-terminated cholesteric polyesters or polycarbonates described in DE-A-197 17 371.

It is also possible to employ crosslinkable oligo- or polyorgano-siloxanes, as are known, for example, from EP-A-0 358 208, DE-A-195 41 820 or DE-A-196 19 460.

Among these compounds preference is given to polyesters or polycarbonates having at least one propargyl end group of the formula $R^3C\equiv C—CH_2—$, where $R^3$ is H, $C_1$–$C_4$-alkyl, aryl or Ar—$C_1$–$C_4$-alkyl (eg. benzyl or phenethyl) which is attached to the polyesters or polycarbonates directly or via a linker. The linker is preferably selected from

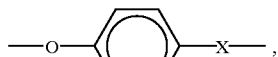

(the propargyl group is attached to X), where $R^4$ is H, $C_1$–$C_4$-alkyl or phenyl, X is O, S or $NR^2$ and $R^2$ is H, $C_1$–$C_4$-alkyl or phenyl.

In the polyesters, the propargyl end group is preferably attached by way of

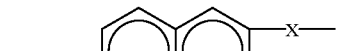

(X = O, S)

The polyesters preferably comprise (IX) at least one aromatic or araliphatic dicarboxylic acid unit and/or at least one aromatic or araliphatic hydroxycarboxylic acid unit, and (X) at least one diol unit.

Preferred dicarboxylic acid units are those of the formula

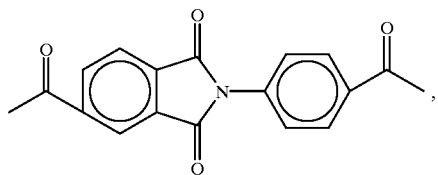

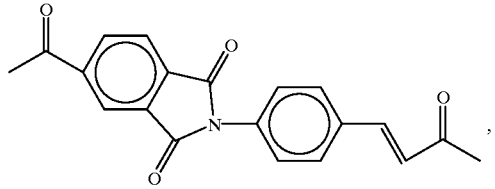

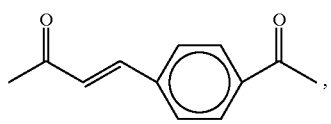

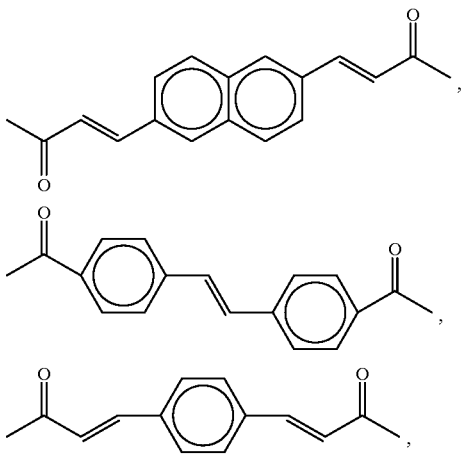

especially those of the formula

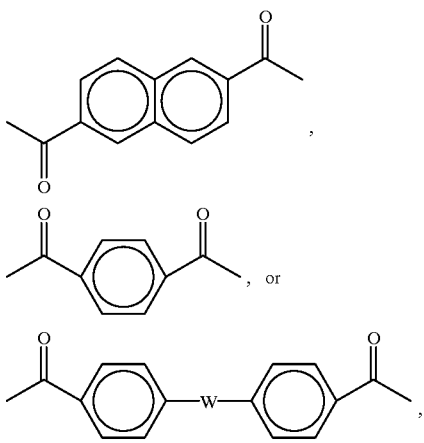, or

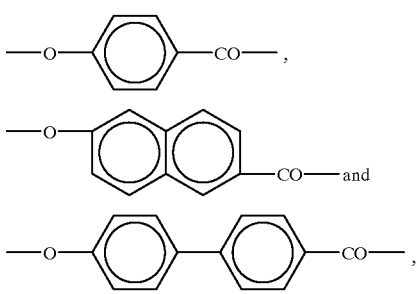, where each of the phenyls or the naphthyl can carry 1, 2 or 3 substituents selected independently from $C_1$–$C_4$-alkyl, $C_1$–$C_4$-alkoxy, halogen or phenyl, and where W is NR, S, O, $(CH_2)_pO(CH_2)_q$, $(CH_2)_m$ or a single bond,
R is alkyl or hydrogen,
m is an integer from 1 to 15, and
p and q independently are integers from 0 to 10.

Preferred hydroxycarboxylic acid units are those of the formula

—O—⌬—CO—,

—O—(naphthyl)—CO— and

—O—⌬—⌬—CO—, where each phenyl or the naphthyl can carry 1, 2 or 3 substituents selected independently from $C_1$–$C_4$-alkyl, $C_1$–$C_4$-alkoxy, halogen or phenyl.

Preferred diol units are those of the formula

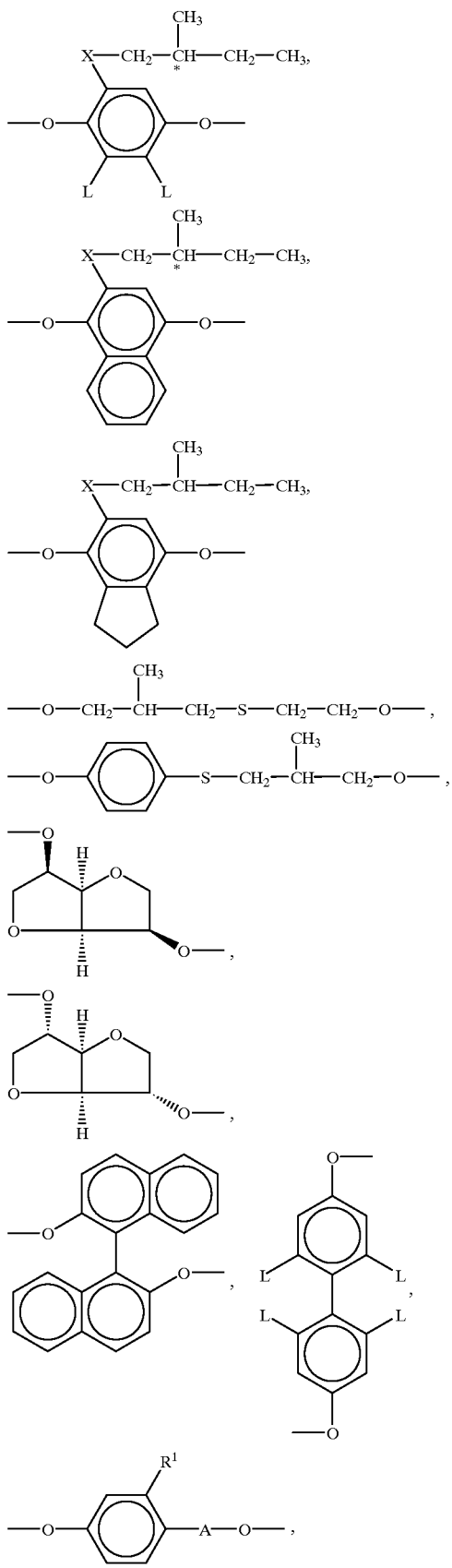

-continued

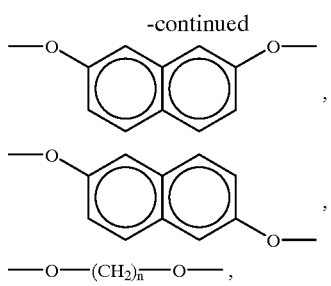

especially those of the formula

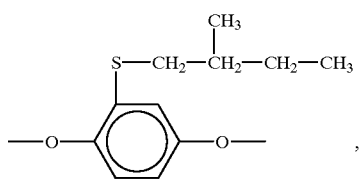

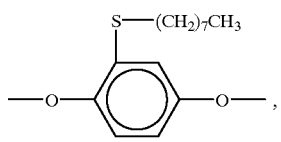

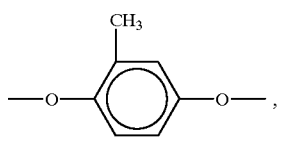

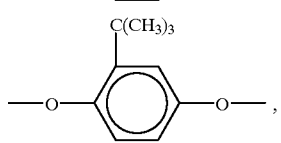

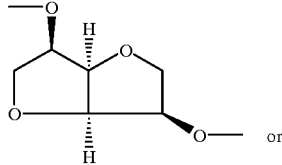

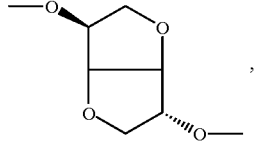

where

L is alkyl, alkoxy, halogen, COOR, OCOR, CONHR or NHCOR,

X is S, O, N, $CH_2$ or a single bond,
A is a single bond, $(CH_2)_n$, $O(CH_2)_n$, $S(CH_2)_n$, $NR(CH_2)_n$,

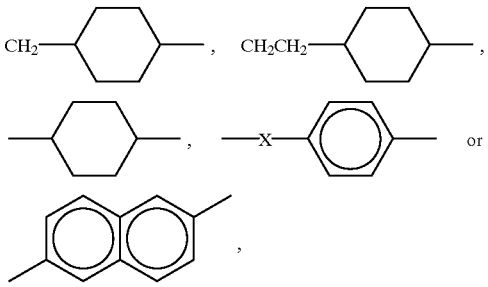

R is alkyl or hydrogen,
$R^1$ is hydrogen, halogen, alkyl or phenyl, and
n is an integer from 1 to 15.

Preference is given to polyesters comprising at least one dicarboxylic acid unit of the formula

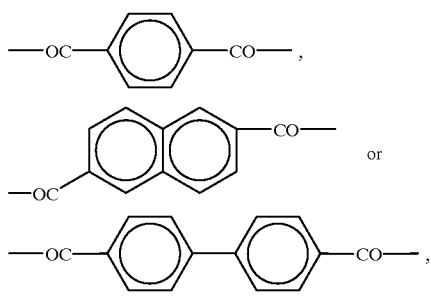

and at least one diol unit of the formula

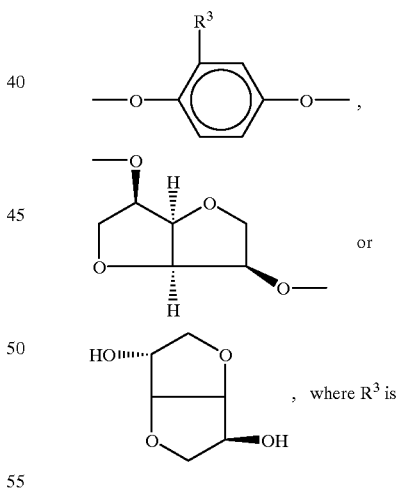

, where $R^3$ is

H, halogen, $C_1$–$C_4$-alkyl, especially $CH_3$ or $C(CH_3)_3$, or is phenyl.

Further preferred compounds are diesters of the formula P—Y—B—CO—O—A—O—CO—B—Y—P, where P is a propargyl end group of the above-defined formula, Y is O, S or $NR^2$ ($R^2$=$C_1$–$C_4$-alkyl), B is

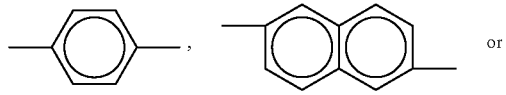

-continued

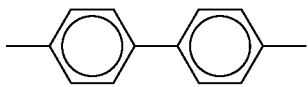

where each phenyl or the naphthyl can carry 1, 2 or 3 substituents selected independently from $C_1$–$C_4$-alkyl, $C_1$–$C_4$-alkoxy, halogen or phenyl, and A (together with the adjacent oxygens) is one of the abovementioned diol units.

Particularly preferred diesters are those of the above formula in which B is

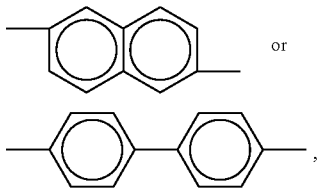

and especially diesters of the formula $$HC\equiv CCH_2O-B-CO-O-A-O-CO-B-OCH_2-C\equiv CH,$$

where (XI) B is 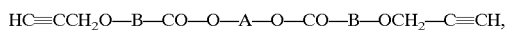 and

A is 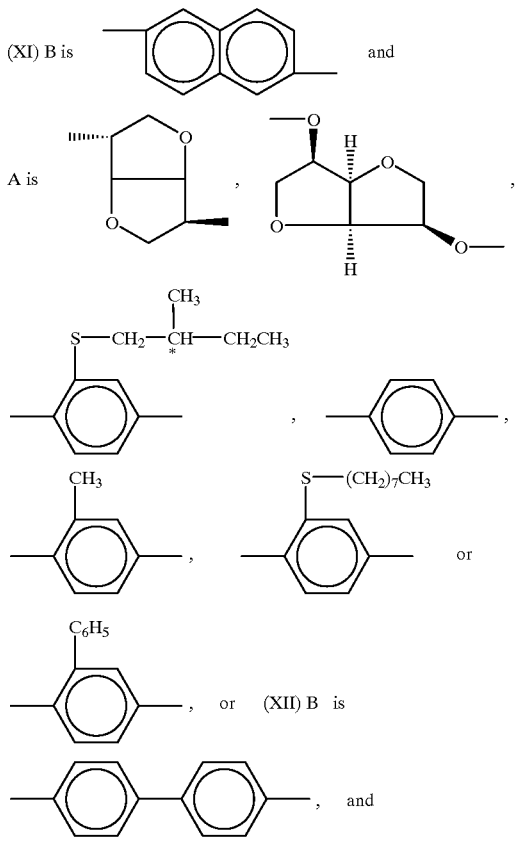, or (XII) B is and

Further preferred compounds are polycarbonates comprising at least one incorporated diol unit of the above formulae, especially of the formulae

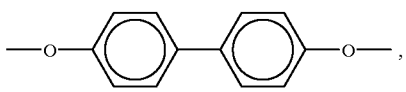

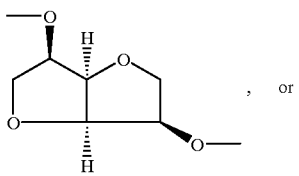, or

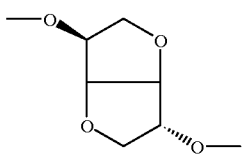

Preference is given here to those polycarbonates which comprise as diol units at least one mesogenic unit of the formula

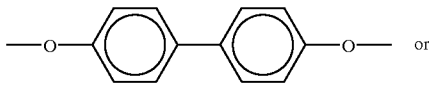 or

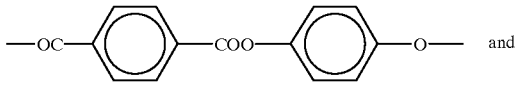 and at least one chiral unit of the formula

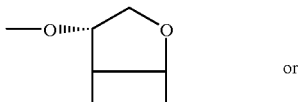 or

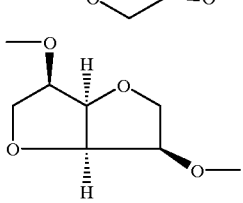

and, if desired, a nonchiral unit of the formula

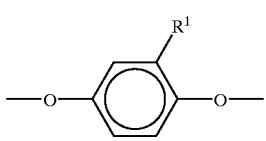

where $R^1$ is as defined above and in particular is H or $CH_3$.

Particularly preferred polycarbonates are those having propargyl end groups of the formula $HC\equiv CCH_2O-R^5-CO$, in which $R^5$ is

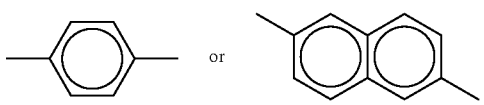

Further suitable polymers of group c) are cholesteric polycarbonates containing photoreactive groups even in a non-terminal position. Such polycarbonates are described in DE-A-196 31 658 and are preferably of the formula XIII

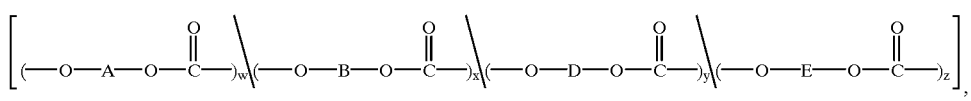

where the molar ratio w/x/y/z is from about 1 to 20/from about 1 to 5/from about 0 to 10/from about 0 to 10. Particular preference is given to a molar ratio w/x/y/z of from about 1 to 5/from about 1 to 2/from about 0 to 5/from about 0 to 5.

In the formula XIII

A is a mesogenic group of the formula

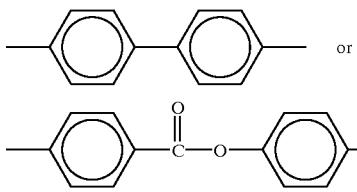

B is a chiral group of the formula

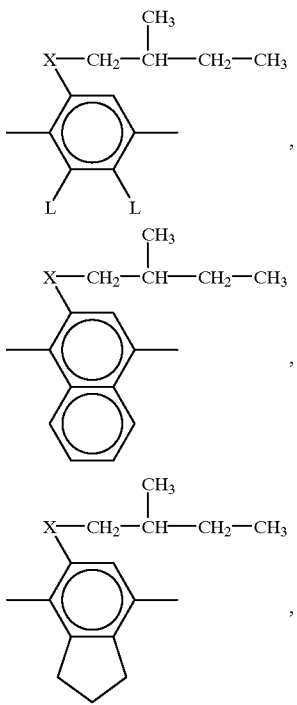

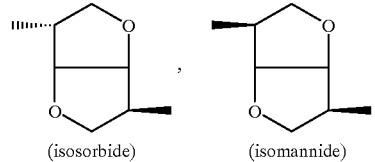

(isosorbide)     (isomannide)

-continued

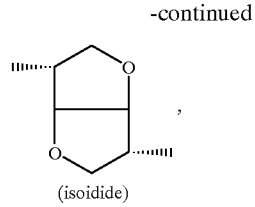

(isoidide)

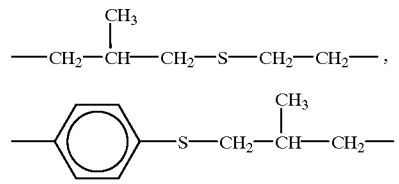

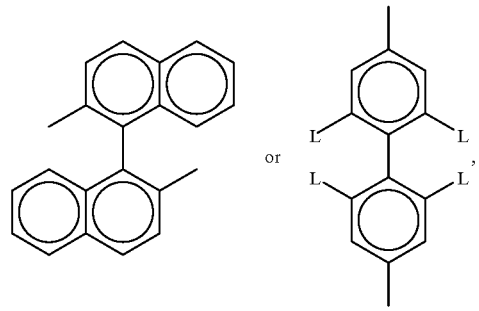

D is a photoreactive group of the formula

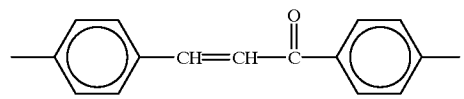

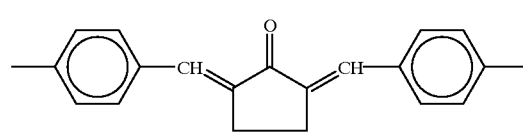

and

E is a further, nonchiral group of the formula

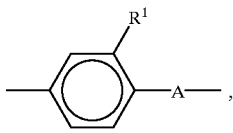

where

L is alkyl, alkoxy, halogen, COOR, OCOR, CONHR or NHCOR,

X is S, O, N, CH$_2$ or a single bond,

R is alkyl or hydrogen,

A is a single bond, (CH$_2$)$_n$, O(CH$_2$)$_n$, S(CU$_2$)$_n$, NR(CH$_2$)$_n$,

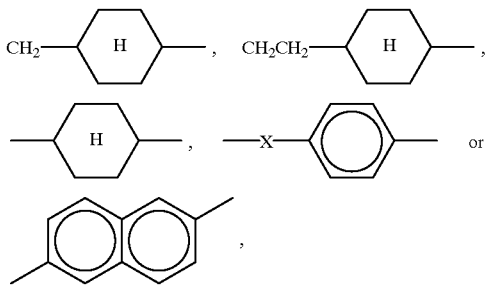

R$^1$ is hydrogen, halogen, alkyl or phenyl, and n is an integer from 1 to 15.

If R$^1$ is alkyl or halogen and A is a single bond or if R$^1$ is H or alkyl and A is

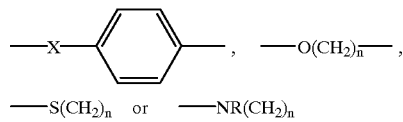

the groups concerned are solubility-enhancing groups. Examples of these are

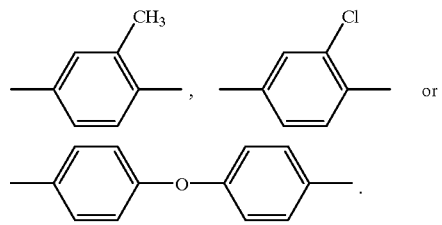

Isosorbide, isomannide and/or isoidide is the preferred chiral component.

The proportion of the chiral diol structural units is preferably within the range from 1 to 80 mol-% of the overall content of diol structural units, with particular preference from 2 to 20 mol-%, depending on the desired interference hue.

Suitable polymers of group e) are chiral nematic polyesters having flexible chains and comprising isosorbide, isomannide and/or isoidide units, preferably isosorbide units, and also comprising at least one chain-flexibilizing unit selected from (and derived from)

(a) aliphatic dicarboxylic acids, (b) aromatic dicarboxylic acids with a flexible spacer, (c) α,ω-alkanoids, (d) diphenols with a flexible spacer, and (e) condensation products of a polyalkylene terephthalate or polyalkylene naphthalate with an acylated diphenol and with an acylated isosorbide, as are described in DE-A-197 04 506.

The polyesters are noncrystalline and form stable Grandjean textures which can be frozen in on cooling to below the glass transition temperature. The glass transition temperatures of the polyesters, in turn, are despite the flexibilization above 80° C., preferably above 90° C. and, in particular, above 100° C.

The polyesters that can be employed include as units (a) preferably those of the formula

where n is from 3 to 15, especially 4 to 12, and with particular preference adipic acid;

as units (b) preferably those of the formula

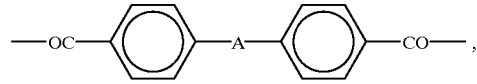

where

A is (CH$_2$)$_n$, O(CH$_2$)$_n$O or (CH$_2$)$_o$—O—(CH$_2$)$_p$, n is from 3 to 15, especially 4 to 12, with particular preference 4 to 10, and o and p independently are from 1 to 7;

as units (c) preferably those of the formula

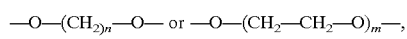

where n is from 3 to 15, especially 4 to 12, with particular preference 4 to 10, and m is from 1 to 10; and as units (d) preferably those of the formula

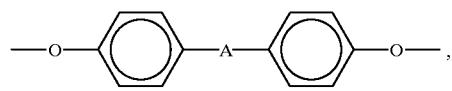

where

A is (CH$_2$)$_n$, O(CH$_2$)$_n$O or (CH$_2$)$_o$—O—(CH$_2$)$_p$, n is from 3 to 15, especially 4 to 12, with particular preference 4 to 10, and o and p independently are from 1 to 7.

The polyesters that can be employed additionally comprise, as nonflexible acid component, preferably dicarboxylic acid units of the formula

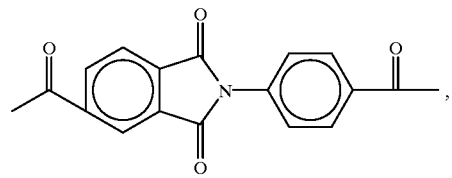

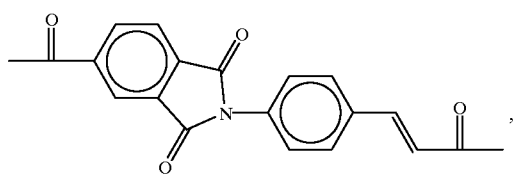,
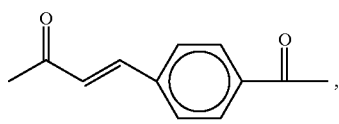,
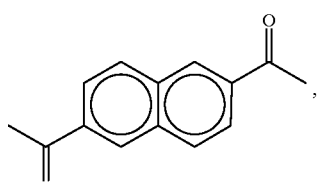,
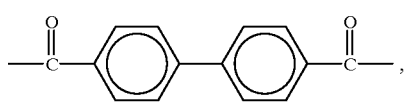,
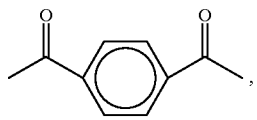,
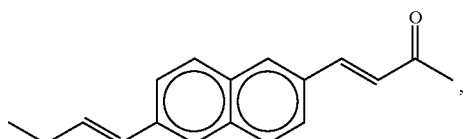,
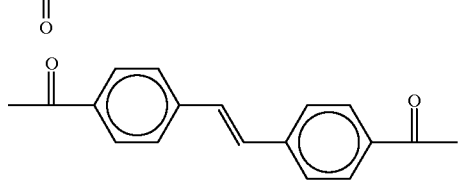,
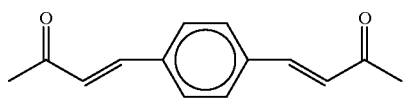 or
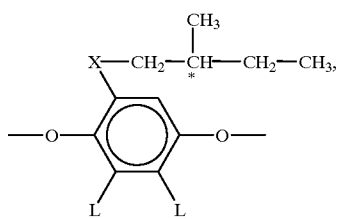
and as nonflexible alcohol component diol units of the formula
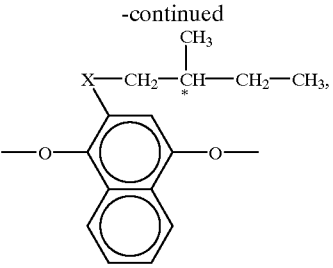
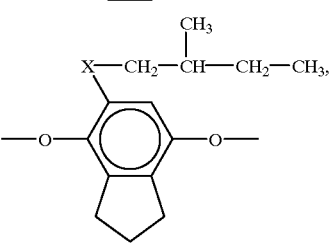
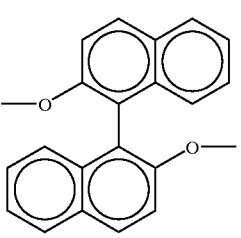, 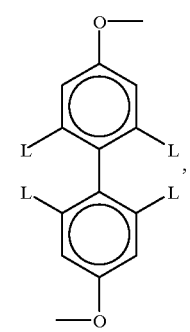,
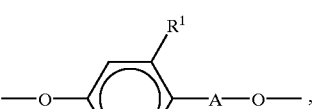
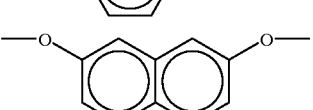 or
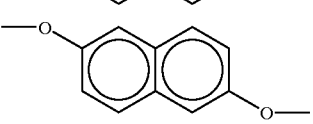
where
L is alkyl, alkoxy, halogen, COOR, OCOR, CONHR or NHCOR,
X is S, O, N, CH$_2$ or a single bond,
A is a single bond,
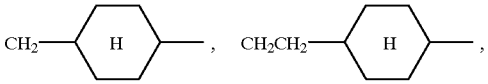
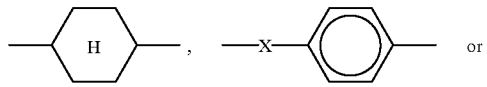 or
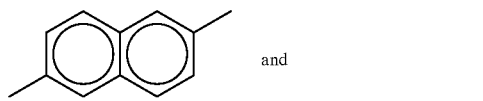 and where
R¹ is hydrogen, halogen, alkyl or phenyl and
R is alkyl or hydrogen.

If desired, the polyesters that can be employed comprise additional flexible diol units of the formula

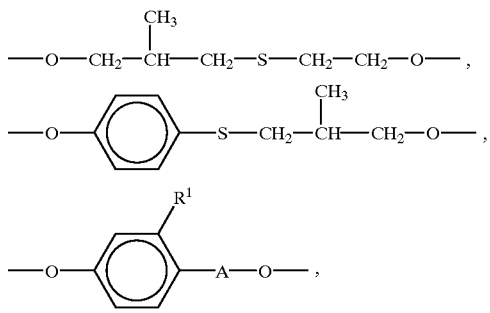

where
R¹ is hydrogen, halogen, alkyl or phenyl,
A is $(CH_2)_n$, $O(CH_2)_n$, $S(CH_2)_n$ or $NR(CH_2)_n$ and
n is from 1 to 15.

Examples of preferred polymers of group d) are crosslinkable cholesteric copolyisocyanates as described in U.S. Ser. No. 08,834,745. Such copolyisocyanates feature repeating units of the formulae

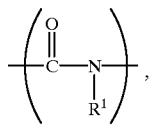   (III)

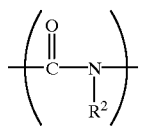   (IV)

and if desired of the formula

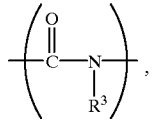   (V)

where
R¹ is a chiral aliphatic or aromatic radical,
R² is a crosslinkable radical and
R³ is an achiral radical.

Unless stated otherwise, alkyl is to be understood here (both alone and in definitions such as alkoxy, dialkyl, alkylthio, etc.) as branched and unbranched $C_1$–$C_{12}$-alkyl, preferably $C_3$–$C_{12}$-, with particular preference $C_4$–$C_{10}$- and, in particular, $C_6$–$C_{10}$-alkyl.

R¹ is preferably selected from (chiral) branched or unbranched alkyl, alkoxyalkyl, alkylthioalkyl, cycloalkyl, alkylphenyl or $C_3$–$C_9$-epoxyalkyl radicals or radicals from esters of $C_1$–$C_6$ fatty acids with $C_1$–$C_6$-alkanols or $C_3$–$C_9$-dialkyl ketones. The ester radical may be attached to the nitrogen either via the fatty acid moiety or via the alkanol residue. The radical R¹ may have 1, 2 or 3 substituents, which are identical or different and are selected from alkoxy, di-$C_1$–$C_4$-alkylamino, CN or $C_1$–$C_4$-alkylthio groups or halogen atoms.

R¹ is preferably selected from alkyl, alkoxyalkyl, radicals from esters of $C_1$–$C_6$ fatty acids with $C_1$–$C_6$-alkanols, $C_3$–$C_9$-dialkyl ketones and epoxidized $C_3$–$C_9$-epoxyalkyl radicals, where R¹ may be substituted by 1 or 2 radicals which are identical or different and are selected from alkoxy, halogen, CN and $CF_3$. Preferred substituents of branched or unbranched alkyl or alkoxy radicals are selected from alkoxy groups, halogen atoms and CN; from esters of $C_1$–$C_6$ fatty acids with $C_1$–$C_6$-alkanols, from alkoxy groups, halogen atoms, CN and $CF_3$; and, for $C_3$–$C_9$-dialkyl ketones, from alkoxy groups, halogen atoms and CN.

The main chain of the radical R¹ has, in particular, a length of from 3 to 12, especially 6 to 10, preferably 6 to 8 members (carbons, oxygens and/or sulfurs). Particularly preferred radicals R¹ are selected from

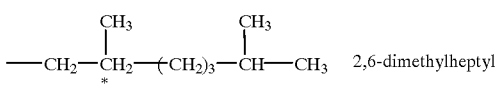   2,6-dimethylheptyl

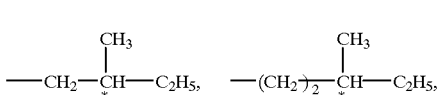

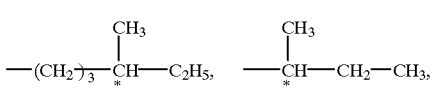

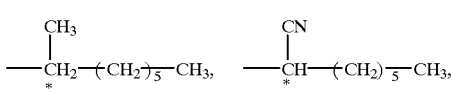

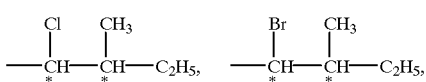

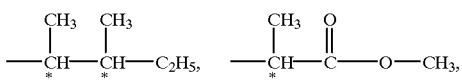

-continued

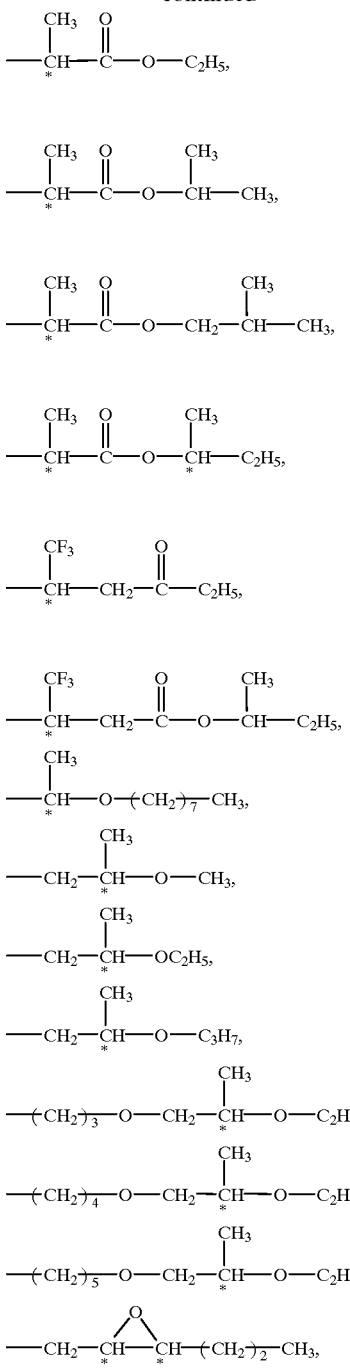

-continued

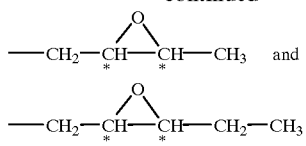

With very particular preference, component III of the copolyisocyanates that can be employed is derived from 2,6-dimethylheptyl isocyanate.

The radical $R^2$ of the copolyisocyanates that can be employed is preferably selected from $C_3$–$C_{11}$-alkenyl radicals, $C_4$–$C_{11}$-vinyl ether radicals (=vinyl $C_2$–$C_9$-alkyl ethers), ethylenically unsaturated $C_3$–$C_{11}$ carboxylic acid radicals and esters of ethylenically unsaturated $C_3$–$C_6$ monocarboxylic acids with $C_2$–$C_6$-alkanols, the linkage to the nitrogen taking place via the alkanol residue of the ester. The radical is with particular preference selected from methyl acrylate, ethyl acrylate, propyl acrylate, n-butyl acrylate, isobutyl acrylate, 2-ethylhexyl acrylate, methyl methacrylate, ethyl methacrylate, propyl methacrylate, n-butyl methacrylate, isobutyl methacrylate, and 2-ethylhexyl methacrylate, especially from ethyl acrylate or ethyl methacrylate.

The radical $R^3$ preferably has the same definitions as the radical $R^1$. However, it is achiral, i.e. it has no center of chirality or is in the form of a racemic mixture.

With particular preference, the main chain of the radical $R^3$ has a length of from 4 to 12, in particular 6 to 10, preferably 6 to 8 members (carbons, oxygens and/or sulfurs). Component V of the copolyisocyanates of the invention is, with very particular preference, derived from n-hexyl isocyanate, n-heptyl isocyanate or n-octyl isocyanate.

Components III, IV and V are preferably present in a molar ratio III:IV:V of about 1 to 20:1 to 20:50 to 98, in particular about 5 to 15:5 to 15:65 to 90, and, with particular preference, about 15:10:75.

The units III, IV and V can be distributed randomly in the copolyisocyanates which can be employed.

Very particular preference is given, in accordance with the invention, to the use of chiral compounds and nematic monomers of group b), especially of chiral compounds of the formula 2:

(2)

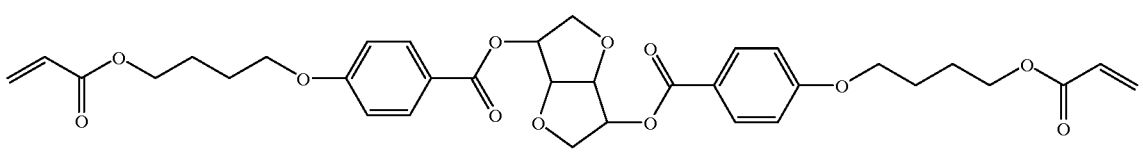

or of the formula 5:

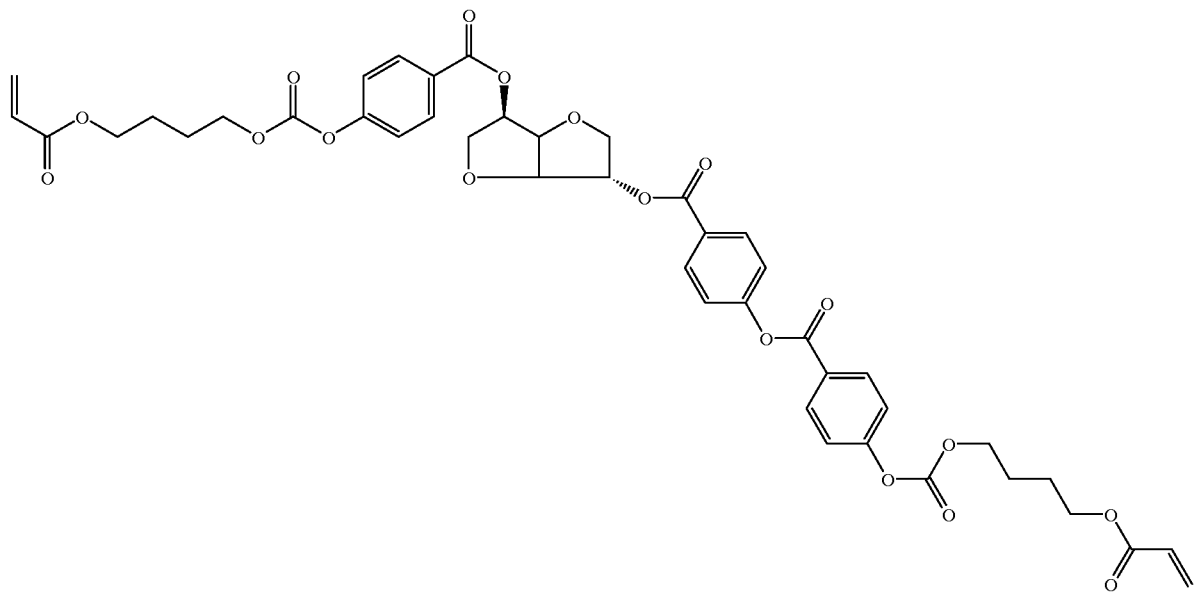

and nematic monomers of the formula 1:

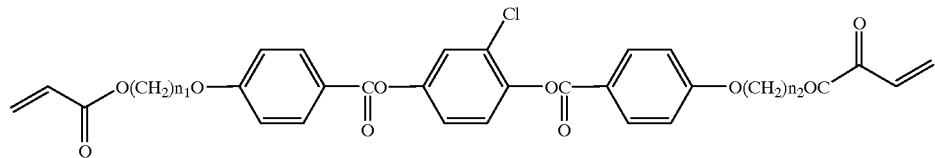

or preferably of the formula 3:

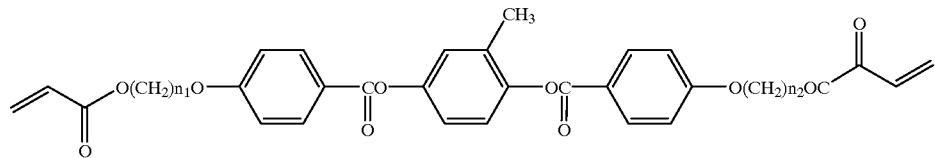

or with particular preference, of the formula 4:

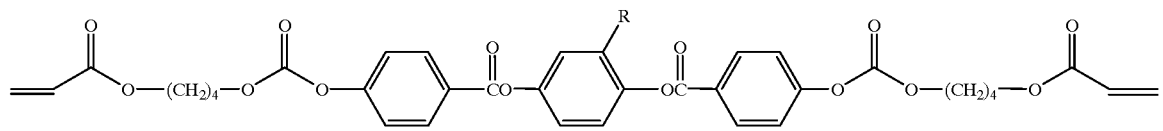

where $n_1$ and $n_2$ in formulae 1 and 3 are independently 4 or 6, R' in the formula 1 is H or Cl and the monomers of the formula 1 or 3 are preferably employed as mixtures of the compounds with $n_1/n_2 = 4/4$, 4/6, 6/4 or 6/6, and R in formula 4 is H, Cl or $CH_3$. It is also possible in accordance with the invention, however, to employ other cholesteric mixtures, examples being the mixtures disclosed in EP-A-686 674.

Diluents which can be employed in the process of the invention for the compounds of the groups a) or b) are linear or branched esters, especially acetic esters, cyclic ethers and esters, alcohols, lactones, aliphatic and aromatic hydrocarbons, such as toluene, xylene and cyclohexane, and also ketones, amides, N-alkylpyrrolidones, especially N-methylpyrrolidone, and in particular tetrahydrofuran (THF), dioxane and methyl ethyl ketone (MEK).

Examples of suitable diluents for the polymers of group c) are ethers and cyclic ethers, such as tetrahydrofuran or dioxane, chlorinated hydrocarbons, such as dichloromethane, 1,1,2,2-tetrachloroethane, 1-chloronaphthalene, chlorobenzene or 1,2-dichlorobenzene. These diluents are particularly suitable for polyesters and polycarbonates. Examples of suitable diluents for cellulose derivatives are ethers, such as dioxane, or ketones, such as acetone. Where copolyisocyanates are employed as polymers of group d) it is advisable to use polymerizable diluents as described in U.S. Pat. No. 08,834, 745. Examples of such polymerizable diluents are

- esters of α,β-unsaturated mono- or dicarboxylic acids, especially $C_3$–$C_6$ mono- or dicarboxylic acids, with $C_1$–$C_{12}$-alkanols, $C_2$–$C_{12}$-alkanediols or their $C_1$–$C_6$-alkyl ethers and phenylethers, for example the acrylates and methacrylates, hydroxyethyl or hydroxypropyl acrylate or methacrylate, and 2-ethoxyethyl acrylate or methacrylate;
- vinyl $C_1$–$C_{12}$-alkyl ethers, such as vinyl ethyl, vinyl hexyl or vinyl octyl ether;
- vinylesters of $C_1$–$C_{12}$ carboxylic acids, such as vinyl acetate, vinyl propionate, vinyl laurate;
- $C_3$–$C_9$ epoxides, such as 1,2-butylene oxide, styrene oxide;
- N-vinylpyrrolidone, N-vinylcaprolactam, N-vinylformamide;
- vinylaromatic compounds, such as styrene, a-methylstyrene, chlorostyrene, and
- compounds having two or more crosslinkable groups, such as diesters of diols (including polyethylene glycols) with acrylic or methacrylic acid, or divinylbenzene.
- Examples of preferred polymerizable diluents are 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate and tetraethylene glycol dimethacrylate. A particularly preferred polymerizable diluent is styrene.

The mixtures of groups a), b) or c) may also include, in small amounts, polymerizable diluents in addition to the inert diluent. Preferred polymerizable solvents which can be added to a), b) or c) are acrylates, especially acrylates of relatively high functionality such as bis-, tris- or tetraacrylates, and with particular preference high-boiling oligoacrylates. The preferred amount added is approximately 5% by weight, based on the overall weight of the mixture.

If desired, water can also be added to the diluent, or can even be employed as the sole diluent.

For photochemical polymerization, the crosslinkable or polymerizable mixture may include customary commercial photoinitiators. For curing by electron beams, such initiators are not required. Examples of suitable photoinitiators are isobutyl benzoin ether, 2,4,6-trimethylbenzoyldiphenylphosphine oxide, 1-hydroxycyclohexyl phenyl ketone, 2-benzyl-2-dimethylamino-1-(4-morpholinophenyl)furan-1-one, mixtures of benzophenone and 1-hydroxycyclohexyl phenyl ketone, 2,2-dimethoxy-2-phenylacetophenone, perfluorinated diphenyltitanocenes, 2-methyl-1-(4-[methylthio]phenyl)-2-(4-morpholinyl)-1-propanone, 2-hydroxy-2-methyl-1-phenylpropan-1-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of 2-isopropylthioxanthone and 4-isopropylthioxanthone, 2-(dimethylamino)ethyl benzoate, d,l-camphorquinone, ethyl-d,l-camphorquinone, mixtures of benzophenone and 4-methylbenzophenone, benzophenone, 4,4'-bisdimethylaminobenzophenone, ($\eta^5$-cyclopentadienyl)($\eta^6$-isopropylphenyl)iron(II) hexafluorophosphate, triphenylsulfonium hexafluorophosphate or mixtures of triphenylsulfonium salts, and also butanedioldi-acrylate, dipropylene glycol diacrylate, hexanediol diacrylate, 4-(1, 1-dimethylethyl)cyclohexyl acrylate, trimethylolpropane triacrylate and tripropylene glycol diacrylate.

The brilliance of the pigment layer can be increased by adding small amounts of suitable leveling agents. It is possible to employ from about 0.005 to 1% by weight, in particular from 0.01 to 0.5% by weight, based on the amount of cholesteric employed. Examples of suitable leveling agents are glycols, silicone oils and, in particular, acrylate polymers, such as the acrylate polymers obtainable under the name Byk 361 or Byk 358 from Byk-Chemie and the modified, silicone-free acrylate polymers obtainable under the name Tego flow ZFS 460 from Tego.

The polymerizable or crosslinkable mixture may also include stabilizers to counter the effects of UV and weather. Examples of suitable such additives are derivatives of 2,4-dihydroxy-benzophenone, derivatives of 2-cyano-3,3-diphenyl acrylate, derivatives of 2,2',4,4'-tetrahydroxybenzophenone, derivatives of ortho-hydroxyphenylbenzotriazole, salicylic esters, ortho-hydroxyphenyl-s-triazines or sterically hindered amines. These substances can be employed alone or, preferably, as mixtures.

The pourable, reactive cholesteric mixture preferably has a viscosity in the range from about 10 to 500 mPas, in particular from about 10 to 100 mPas, measured at 23° C.

The cholesteric mixture is, with particular preference, applied to the substrate at a rate from about 1 to 800 m/min, in particular from about 5 to 100 m/min.

In a preferred embodiment of the process of the invention the mixture is applied by means of a reverse roll coater, a kiss coater or, in particular, by means of a cast-film extruder, bar coater or knife coater, with very particular preference by means of a bar coater or knife coater, to the substrate.

Advantageously, the mixture is applied by means of a casting apparatus which subjects the mixture to a high shear rate during application.

Preference is given to the use of a casting apparatus whose casting slot width is in the range from about 2 to 50 μm, in particular from about 4 to 15 μm. It is also advantageous to operate with a coater overpressure of from about 0.01 to 0.7 bar, preferably from 0.05 to 0.3 bar.

Apparatus particularly suitable in accordance with the invention for producing cholesteric layers comprise coating machines with a knife-coater applicator unit with which it is possible to apply a cholesteric mixture to a substrate film which is guided over a roller which runs with very high circular accuracy. Advantageously, the casting knife is mounted on a precision carriage so as to allow precise adjustment of a defined gap relative to the substrate film.

If desired, the coating machine is provided with cooling devices, for example with cooling rolls, so that even temperature-sensitive films can be used as substrates.

The cholesteric mixture is preferably applied under elevated pressure, in particular at a coater overpressure in the range from about 0.01 to 0.7 bar, with particular preference from 0.05 to 0.3 bar.

The applied layer is dried by means of a drying apparatus, for instance an air circulation drier, and subsequently or alternatively is subjected to polymerization or crosslinking by means of heat, UV or electron beams, preference being given to curing by means of UV radiation or electron beams.

The applied layer is preferably dried to a residual content of volatile diluents of less than 1% by weight, based on the dry weight of the applied layer. Drying takes place preferably at from 20 to 100° C. over a period from about 2 to 60 seconds.

The cured cholesteric layer has a mean dry layer thickness of from 0.5 to 20 $\mu$m, e.g. from 1 to 10 $\mu$m, in particular from 1 to 4.5 $\mu$m, and, with particular preference, from 1 to 3 $\mu$m, or from 2 to 4 $\mu$m. The cholesteric layers produced in accordance with the invention have a mean fluctuation in layer thickness of ±0.2 $\mu$m or less, resulting in a highly consistent color of the cholesteric layer. The mean fluctuation in layer thickness can be determined easily by means, for example, of microscopy using thin sections. A suitable method of determination can be carried out, for example, in accordance with the methodology described in EP-A-0 566 100.

The cholesteric layers prepared in accordance with the invention can additionally be characterized by at least one of the following parameters:

a) Rz (according to DIN 4768): $\leq$210 nm, in particular $\leq$110 nm, e.g. about 105 to 40 nm;

b) Ra (according to DIN 4768/1): $\leq$40 nm, in particular $\leq$20 nm, preferably $\leq$16 nm, e.g. 15 to 5 nm;

c) Gloss (according to DIN 67530) on application of the cholesteric to a PET film with a black back-coating, and at a measurement angle of 60°:
$\geq$90, such as e.g. 100 to 190, and especially
$\geq$100, such as e.g. 100 to 130 with maximum reflection in the blue spectral range; or
$\geq$130, such as e.g. 130 to 160 with maximum reflection in the green spectral range; or
$\geq$160, such as e.g. 160 to 190 with maximum reflection in the red spectral range;

d) domain diameter: $\geq$5 $\mu$m, especially $\geq$15 $\mu$m, preferably $\geq$20 $\mu$m or $\geq$25 $\mu$m with tendency toward resolution;

e) depth of the microgrooves which delimit the domains: $\leq$110 m, especially $\leq$50 nm, preferably $\leq$15 nm, such as e.g. 10 to 3 nm.

In one embodiment of the process of the invention, the cured cholesteric layer is removed from the substrate and, if desired, is comminuted to form pigments.

A further preferred embodiment of the process of the invention comprises coating the substrate with at least one further cholesteric mixture of identical or different composition. The cholesteric layers may have different colors or different handedness. In particular the substrate is coated, after or between the application of the cholesteric layer(s), with at least one further layer selected from a release layer, a layer which absorbs transmitted light, an adhesive layer, stabilizer layer, support layer or cover layer.

In another preferred embodiment the cured layer structure obtained in accordance with the invention and comprising two or more sublayers is removed from the substrate and made up in a desired fashion (eg. as effect film sheets) or, if desired, is comminuted to form special-effect pigments.

Layer structures of the invention which can be used are also obtained, however, when the substrate is not removed from the cholesteric layer structure. For example, it is possible in accordance with the invention to prepare effect film webs which as a further constituent comprise a preferably thermoplastic carrier film. This enables the films to be prepared in large quantities in a particularly rational procedure.

In the process of the invention it is advantageous to employ coating apparatus which enable precise single or multiple coatings to be obtained not only with cholesteric mixtures but also with other pourable systems. This permits the efficient production of strip-form cholesteric material which comprises one or more layers and in which the layer sequence may vary depending on the desired application.

The present invention therefore additionally provides for a cholesteric material, preferably in web or sheet form, having the following layer sequence:

A) if desired, at least one release layer,

B) at least one cholesteric color effect layer,

C) if desired, at least one layer which absorbs all or some transmitted light,

D) if desired, at least one further cholesteric color effect layer, and

E) if desired, at least one further layer selected from a release layer, a transparent or colored hotmelt adhesive layer or a transparent or colored thermoplastic layer.

Examples of such layer structures are:

1) at least one cholesteric color effect layer, 2) at least one cholesteric color effect layer—at least one layer which absorbs all or some transmitted light—at least one cholesteric color effect layer, 3) at least one release layer—at least one cholesteric color effect layer, 4) at least one release layer—at least one cholesteric color effect layer—at least one layer which absorbs all or some transmitted light—at least one cholesteric color effect layer, 5) at least one cholesteric color effect layer—at least one hotmelt adhesive layer, 6) at least one cholesteric color effect layer—at least one thermoplastic layer, 7) at least one cholesteric color effect layer—at least one layer which absorbs all or some transmitted light—at least one cholesteric color effect layer—at least one hotmelt adhesive layer, 8) at least one cholesteric color effect layer—at least one layer which absorbs all or some transmitted light—at least one cholesteric color effect layer—at least one thermoplastic layer, 9) at least one release layer—at least one cholesteric color effect layer—at least one hotmelt adhesive layer, 10) at least one release layer—at least one cholesteric color effect layer—at least one thermoplastic layer, 11) at least one release layer—at least one cholesteric color effect layer—at least one release layer, 12) at least one release layer—at least one cholesteric color effect layer—at least one layer which absorbs all or some transmitted light—at least one cholesteric color effect layer—at least one hotmelt adhesive layer, 13) at least one release layer—at least one cholesteric color effect layer—at least one layer which absorbs all or some transmitted light—at least one cholesteric color effect layer—at least one thermoplastic layer, 14) at least one release layer—at least one cholesteric color effect layer—at least one layer which absorbs all or some transmitted light—at least one cholesteric color effect layer—at least one release layer.

The abovementioned thermoplastic layer can in this case be the substrate layer itself or a layer additionally applied to the support.

The release layer which may be present comprises, for example, polyolefin compounds or silicone-containing compounds.

The layers A) to E) can be radiation-crosslinkable and if so comprise radiation-crosslinkable systems containing unsaturated groups or epoxide groups, examples being polyurethane acrylates, polyester acrylates, acrylized polymers, epoxy acrylates or melamine acrylates.

If radiation crosslinking is to take place by UV radiation, the layers A) to E) may comprise one, or a mixture, of the photoinitiators described above.

It is particularly preferred to apply the layers wet-on-wet to the substrate in one application procedure, to carry out conjoint drying, if desired, and then to carry out conjoint curing, if desired. Techniques particularly suitable for the simultaneous application of said layers are knife or bar coating processes, cast-film extrusion or stripping processes, and the cascade coating process. In the case of the knife or bar coating process, the liquid is applied to a substrate through a slot in a casting block, the layer thickness being adjustable by way of a defined knife or bar gap between a roller, over which the substrate is guided, and the lip of the coater. To apply the bottom (first) layer, the first casting block is brought toward the roller; to apply the second layer, a second casting block is brought toward the first casting block, and, to apply the third layer, a third casting block is brought against the second, and so on. An analogous process is described in DE-A-19 504 930, which is incorporated herein by reference. All liquids run to their respective coating blade or bar and are coated out simultaneously over one another. In the case of the cast-film extrusion or stripper coating process, a flexible substrate, such as a film, is guided past the coater head under defined web tension between two rollers. The amounts of liquid appropriate to the desired layer thickness are applied simultaneously to the substrate from parallel casting slots arranged transverse to the running direction of the web. A process of this kind is described, for example, in EP-A-431 630, DE-A-3 733 031 and EP-A-452 959, which are incorporated herein by reference. In the cascade coating process, the substrate is guided over a roller. The liquids to be applied run over one another from differently arranged slots and then run together on to the substrate. This process is likewise described in DE-A-19 504 930. It is of course also possible first to apply only one layer, to subject this layer, if desired, to drying and to curing, and then to apply two or more layers wet-on-wet to the cured cholesteric layer by means, for example, of one of the abovementioned processes. It is likewise possible to subject the layers to individual and successive application, optional drying and curing.

Suitable layer substrates are preferably known, preferably thermoplastic, films formed from polyesters, such as polyethylene terephthalate or polyethylene naphthalate, and also polyolefins, cellulose triacetate, polycarbonates, polyamides, polyimides, polyamidoimides, polysulfones, aramids or aromatic polyamides. The thickness of the layer substrates is preferably from about 5 to 100 $\mu$m, in particular from about 10 to 20 $\mu$m. The layer substrate can be subjected beforehand to a corona discharge treatment, a plasma treatment, a gentle adhesion treatment, a heat treatment, a dedusting treatment or the like. The layer substrate preferably has a mean center-line surface roughness of 0.03 $\mu$m or less, in particular of 0.02 $\mu$m or less, and, with particular preference, of 0.1 $\mu$m or less. It is desirable, moreover, for the substrate to have not only a low mean center-line surface roughness of this kind but also to possess no great projections (raised areas) of 1 $\mu$m or more. The roughness profile of the surface of the substrate can be varied by means of fillers which are added to the layer substrate in the course of its production. Examples of suitable fillers are oxides and carbonates of Ca, Si and Ti, and fine organic powders of acrylic substances.

The substrate can also be a metallized foil or a preferably polished metal strip.

The cholesteric material in strip form according to the invention can, together if desired with the substrate, be used as, in or but [sic] on films or on paper, depending on the nature and sequence of the layers; for example, in, as or on color effect films for coating planar and nonplanar articles or on wrapping paper. Films of strip-form cholesteric material according to the invention can be used in particular for film laminating, thermoforming or backspraying.

The present invention also provides pigments which are obtainable by the comminution of single- or multilayer strip-form cholesteric material according to the invention. The material according to the invention is for this purpose detached from its preferably strip-form substrate. The detachment of the crosslinked cholesteric material from the substrate can be carried out, for example, by guiding the substrate over a deflecting roller having a small diameter. As a consequence of this the crosslinked material will then peel off from the substrate. Other known methods are equally suitable: for example, the stripping of the substrate over a sharp edge, or by way of an air knife, ultrasound or combinations thereof. The cholesteric material, now devoid of its substrate, is comminuted to a desired particle size. This can be done, for example, by grinding in universal mills. Depending on the intended use of the pigments it is possible to produce particles having a diameter of from 5 μm to about 200 μm. The pigments preferably have a particle size of from. 10 to 50 μm, in particular from 15 to 30 μm. In order to narrow the particle size distribution the comminuted pigments can subsequently be classified by means, for example, of a sieving process.

Preferred pigments of the invention are multilayer pigments, especially three-layer pigments comprising two cholesteric layers with a layer in between which absorbs all or some transmitted light.

The present invention therefore also provides platelet-shaped cholesteric multilayer pigments comprising the layer sequence $A^1/B/A^2$, where $A^1$ and $A^2$ are identical or different and each comprise at least one cholesteric layer, and B is at least one interlayer which separates the layers $A^1$ and $A^2$ from one another and which absorbs some or all of the light transmitted by the layers $A^1$ and $A^2$.

Such multilayer pigments of the invention offer a range of surprising advantages:

a) B can be made fully hiding (completely absorbing transmitted light) so that, with a sufficient level of pigmentation, the perceived color of the pigment is entirely independent of the substrate and so that a complex and costly treatment of the substrate matched to transparent interference pigments, as has been conventional to date, is unnecessary. Self-opacifying cholesteric effect pigments are therefore provided for the first time.

b) The color of B can be varied, thereby providing a further parameter for controlling the perceived color of the overall pigment.

c) The brightness of the overall pigment can additionally be adjusted by varying the gloss and/or roughness of B.

d) B can be varied specifically for each application in order to adjust the hardness and/or flexibility of the overall pigment.

e) B can be electrically conductive and so impart electrical conductivity to the pigment as a whole without thereby impairing the quality of the cholesteric layers.

f) $A^1$, B and $A^2$ are of uniform thickness and are stacked in parallel to one another on top of one another, so forming a kind of sandwich structure which considerably intensifies the brightness of the pigment. Moreover, it brings about an improved perceived color in comparison to pigments with an all-round coating, because all of the cholesteric molecules of a layer have the same alignment.

g) The perceived color of the pigment is largely independent of external stimuli, i.e., it is stable over a wide range of temperatures and pressures.

The upper and lower cholesteric layer, $A^1$ and $A^2$ respectively, of the pigment of the invention possess identical or different optical properties. In particular, they may reflect light of the same or different wavelength, i.e., they may be of the same or of a different color. In the latter case it is possible to achieve particularly interesting color effects. With particular preference, $A^1$ and $A^2$ are of different handedness, so that, for example, $A^1$ reflects light of a certain wavelength with left-handed circular polarization whereas $A^2$ reflects light of the same wavelength with right-handed circular polarization. Advantageously, therefore, a coating material, for example, comprising pigments of the invention in this preferred embodiment appears particularly bright, since in the coating film $A^1$ and $A^2$ are positioned facing the incident light in statistical distribution, so that the coating material reflects both right- and left-handedly circular-polarized light of a certain wavelength, whereas a coating material containing only pigments having only one cholesteric layer or having two or more cholesteric layers of the same handedness transmits either the left- or the right-handedly circular-polarized light.

$A^1$ and $A^2$ can also be the same or different in terms of their mechanical properties. For example, they may differ in thickness or brittleness.

Another preferred embodiment comprises three-layer pigments, in which the absorption pigments of the layer B are bound into a binder matrix comprising the cholesteric mixtures described above as constituents of the layers $A^1$ and $A^2$. With very particular preference, the binder matrix of the layer B comprises the same cholesteric mixtures as the layers $A^1$ and $A^2$.

Preferably, the layer thickness of each individual cholesteric layer of $A^1$ or $A^2$ is from about 0.5 to 20 μm, in particular from about 1 to 10 μm and, with particular preference, from about 2 to 4 μm. The layer thickness of each individual layer of B is from about 0.2 to 5 μm, in particular from about 0.5 to 3 μm. The diameter of the pigments of the invention is from about 5 to 500 μm, in particular from about 10 to 100 μm and, with particular preference, from about 10 to 30 μm. In general, the pigment diameter is about 5 times the pigment thickness.

The present invention additionally provides a process for preparing the above three-layer pigments, which comprises applying the layers $A^1$, B and $A^2$ atop one another on a substrate, simultaneously or with a time offset, curing them thermally, by means of UV radiation or electron beams, or by rapid cooling to below the glass transition temperature, again simultaneously or with a time offset, removing the cured layers from the substrate, and then comminuting them to give pigments.

The application of the layers $A^1$, B and $A^2$ to the substrate can be carried out by means of one of the abovementioned techniques. The substrate can also be a metallized film or a preferably polished metal strip.

The layers $A^1$, B and $A^2$ can be of low or high viscosity when applied to the substrate, but are preferably of low viscosity. For this purpose, the cholesteric mixtures and the formulations comprising absorption pigment can be applied to the substrate in a form in which they are diluted to a low extent, at elevated temperature, or in highly diluted form at a low temperature. It is particularly preferred to apply the three layers $A^1$, B and $A^2$ wet-on-wet to the substrate in one application process, to subject them if desired to conjoint drying, and thereafter to cure them together.

For the simultaneous wet-on-wet application of said layers, it is particularly preferred if the layer B comprises absorption pigments bound in a matrix of the same cholesteric mixture which is also present in layers $A^1$ and $A^2$. By this means,.any possible disruptive layer boundaries between $A^1$, B and $A^2$ are avoided, so giving a homogeneous system comprising homogeneously distributed pigments in the central region.

Coating techniques particularly suitable for the simultaneous application of said layers are knife or bar coating processes, especially those described above, cast-film extrusion or stripping processes, and the cascade coating process.

The layer which absorbs all or some transmitted light comprises at least one inorganic or organic white, colored or black pigment. Examples of suitable inorganic absorption pigments are titanium dioxide, $Al_2O_3$, barium sulfate, strontium sulfate, zinc oxide, zinc phosphates, black iron oxide, lead chromate, strontium chromate, barium chromate and also metal pigments such as aluminum powder or bronze powder.

Examples of suitable organic absorption pigments are azo pigments, metal complex pigments, such as azo- and azomethine-metal complexes, isoindolinone and isoindoline pigments, phthalocyanine pigments, quinacridone pigments, perinone and perylene pigments, anthraquinone pigments, diketopyrrolopyrrole pigments, thioindigo pigments, dioxazine pigments, triphenylmethane pigments, quinophthalone pigments and fluorescent pigments.

Particularly suitable absorption pigments are fine such pigments having a mean particle size of from 0.01 to 1 $\mu$m, preferably from 0.01 to 0.1 $\mu$m.

It is preferably possible to employ graphite pigments or various grades of carbon black, especially readily dispersible pigment-grade carbon blacks having a specific surface area of from 30 to 150 $m^2$/g (BET method) and an absorption capacity of from 50 to 100 ml of dibutyl phthalate/100 g (DBP number).

Particularly preferred absorption pigments are those which impart magnetic properties to the layer which absorbs transmitted light. Suitable examples are $\gamma$-$Fe_2O_3$, $Fe_3O_4$, $CrO_2$ or ferromagnetic metal pigments e.g. Fe, Fe—Cu or Fe—Ni—Cu alloys. with these pigments it is possible to produce highly lustrous black intermediate layers.

Pigments whose absorbing layer is magnetic are also provided by the present invention. Such pigments can, advantageously, be given an arbitrary orientation by application of a magnetic field. In this way it is possible, for instance, to prevent individual pigment platelets projecting from the others, which results in the scattering of less light and an improvement in the perceived color. All of the platelets can be oriented together in a defined angle. It is also possible to generate full-area patterns for obtaining new color effects, or partial patterns for optical emphasis of letters or structures. The magnetic cholesteric pigments of the invention can also be employed with advantage in a liquid matrix, for example in LCDs, in which they alter their direction and therefore their perceived color when a magnetic field is applied.

The absorption pigments are preferably bound into an organic binder matrix. Suitable binders are the customary coatings systems. Suitable systems are preferably radiation-curable systems which have reactive crosslinkable groups, such as acrylic, methacrylic, $\alpha$-chloroacrylic, vinyl, vinyl ether, epoxy, cyanate, isocyanate or isothiocyanate groups. Suitable binders are also monomeric agents and mixtures thereof with polymeric binders. Preferred monomeric agents are those which have two or more crosslinkable groups, such as acrylic, methacrylic, $\alpha$-chloroacrylic, vinyl, vinyl ether, epoxy, cyanate, isocyanate or isothiocyanate groups. Particular preference is given to acrylic, methacrylic or vinyl ether groups. Examples of monomeric agents having two crosslinkable groups are the diacrylates, the divinyl ethers or the dimethacrylates of diols such as propanediol, butanediol, hexanediol, ethylene glycol, diethylene glycol, triethylene glycol or tetrapropylene glycol, for example.

Examples of monomeric agents having three crosslinkable groups are the triacrylates, the trivinyl ethers or the trimethacrylates of triols such as trimethylolpropane, ethoxylated trimethylolpropane having 1 to 20 ethylene oxide units, propoxylated trimethylolpropane having 1 to 20 propylene oxide units, and mixed ethoxylated and propoxylated trimethylolpropane in which the sum of ethylene oxide and propylene oxide units is from 1 to 20. Examples of monomeric agents having three crosslinkable groups are also the triacrylates, the trivinyl ethers or the trimethacrylates of glycerol, ethoxylated glycerol having 1 to 20 ethylene oxide units, propoxylated glycerol having 1 to 20 propylene oxide units, and mixed ethoxylated and propoxylated glycerol in which the sum of ethylene oxide and propylene oxide units is from 1 to 20.

Examples of monomeric agents having four crosslinkable groups are the tetraacrylates, the tetravinyl ethers or the tetramethacrylates of tetraols such as bis-trimethylolpropane, ethoxylated bis-trimethylolpropane having 1 to 20 ethylene oxide units, propoxylated bis-trimethylolpropane having 1 to 20 propylene oxide units, and mixed ethoxylated and propoxylated bis-trimethylolpropane, in which the sum of ethylene oxide and propylene oxide units is from 1 to 20. Further examples of monomeric agents having four crosslinkable groups are the tetraacrylates, the tetravinyl ethers or the tetramethacrylates of tetraols such as pentaerythritol, ethoxylated pentaerythritol having 1 to 20 ethylene oxide units, propoxylated pentaerythritol having 1 to 20 propylene oxide units, and mixed ethoxylated and propoxylated-pentaerythritol in which the sum of ethylene oxide and propylene oxide units is from 1 to 20.

To enhance the reactivity in the course of crosslinking or polymerization in air it is possible for the binders and the monomeric agents to include from 0.1 to 10% of a primary or secondary amine. Examples of suitable amines are ethanolamine, diethanolamine or dibutylamine.

The absorption pigment formulation can be prepared by the customary dispersion techniques, which are known in the art, and using diluents, dispersants, photoinitiators and, if desired, further additives.

Diluents which can be used are water or organic liquids or mixtures thereof, preference being given to organic liquids. Particularly preferred organic liquids are those having a boiling point of below 140° C., especially ethers such as tetrahydrofuran, ketones such as ethyl methyl ketone and esters such as butyl acetate.

Dispersants which can be used are low molecular mass dispersants such as stearic acid, for example, or else polymeric dispersants. Suitable polymeric dispersants or dispersing resins are known to the skilled worker. Particular mention may be made of sulfonate-, phosphate-, phosphonate- or carboxyl-functional polyurethanes, carboxyl-functional vinyl chloride copolymers, polyimine polyesters or polyether acrylates with or without incorporated functional groups.

For the preparation of crosslinkable or polymerizable absorption pigment formulations it is possible to use the photoinitiators customary for photochemical polymerization, examples being the photoinitiators listed above for the photochemical polymerization of the cholesteric mixtures.

The invention additionally provides compositions comprising pigments of the invention.

Particularly preferred compositions of the invention are coating materials, such as paints and varnishes, which comprise not only the pigments of the invention but also one or more substances selected from water borne coatings, for example in the form of aqueous dispersions, such as PMA, SA, polyvinyl derivatives, PVC, polyvinylidene chloride, SB copolymer, PV-AC copolymer resins, or in the form of water-soluble binders, such as shellac, maleic resins, rosin-modified phenolic resins, linear and branched, saturated polyesters, amino resin-crosslinking saturated polyesters, fatty acid-modified alkyd resins, plasticized urea resins, or in the form of water-thinnable binders, such as PU dispersions, EP resins, urea resins, melamine resins, phenolic resins, alkyd resins, alkyd resin emulsions, silicone resin emulsions; powder coatings, such as powder coatings for TRIBO/ES, such as polyester coating powder resins, PU coating powder resins, EP coating powder resins, EP/SP hybrid coating powder resins, PMA coating powder resins, or powder coatings for fluidized-bed sintering, such as thermoplasticized EPS, LD-PE, LLD-PE, HD-PE; solvent borne coatings, such as one- and two-component coating materials (binders) examples being shellac, rosin esters, maleate resins, nitrocelluloses, rosin-modified phenolic resins, physically drying saturated polyesters, amino resin-crosslinking saturated polyesters, isocyanate-crosslinking saturated polyesters, self-crosslinking saturated polyesters, alkyds with saturated fatty acids, linseed oil alkyd resins, soya oil resins, sunflower oil alkyd resins, safflower oil alkyd resins, ricinene alkyd resins, tung oil/linseed oil alkyd resins, mixed-oil alkyd resins, resin-modified alkyd resins, styrene/vinyltoluene-modified alkyd resins, acrylicized alkyd resins, urethane-modified alkyd resins, silicone-modified alkyd resins, epoxy-modified alkyd resins, isophthalic acid alkyd resins, unplasticized urea resins, plasticized urea resins, melamine resins, polyvinyl acetals, non crosslinking P(M)A homo- or copolymers, non crosslinking P(M)A homo- or copolymers with non acrylic monomers, self-crosslinking P(M)A homo- or copolymers, P(M)A copolymers with other non acrylic monomers, externally crosslinking P(M)A homo- or copolymers, externally crosslinking P(M)A copolymers with non acrylic monomers, acrylate copolymer resins, unsaturated hydrocarbon resins, organic-soluble cellulose compounds, silicone combination resins, PU resins, P resins, peroxide-curing unsaturated synthetic resins, radiation-curing synthetic resins, both photoinitiator-containing and photoinitiator-free radiation-curing synthetic resins; solvent-free coating materials (binders) such as isocyanate-crosslinking, saturated polyesters, two-pack PU resin systems, moisture-curing 1-component PU resin systems, EP resins, and also synthetic resins-individually or in combination—such as acrylonitrile-butadiene-styrene copolymers, ES, cellulose acetate, cellulose acetobutyrate, cellulose acetopropionate, cellulose nitrate, cellulose propionate, artificial horn, epoxy resins, polyamide, polycarbonate, polyethylene, polybutylene terephthalate, polyethylene terephthalate, polymethyl methacrylate, polypropylene, polystyrene, polytetrafluorethylene, polyvinyl chloride, polyvinylidene chloride, polyurethane, styrene-acrylonitrile copolymers, unsaturated polyester resins in the form of granules, powders or casting resin.

The compositions of the invention can, for example, comprise single-layer pigments of the same color but different handedness, as a result of which substantially more light of the same wavelength is reflected than in the case of compositions comprising pigments of identical handedness.

The compositions of the invention may additionally comprise stabilizers to counter the effects of UV and weather, and also inorganic or organic pigments, as described above.

The pigments of the invention can be incorporated individually or in mixtures into the compositions of the invention where they may if desired be subjected to additional alignment by methods which initiate shear forces. Suitable methods of aligning the pigments of the invention are printing and knife coating or, in the case of magnetic pigments, applying a magnetic field.

The present invention also provides for the use of the pigments of the invention in the vehicle and vehicle accessories sector, in the leisure, sport and play sector, in the cosmetics field, in the textile, leather or jewelry field, in the gift product field, in writing utensils, packaging or spectacle frames, in the construction sector, in the household sector and in connection with printed products of all kinds, such as cardboard packaging, other packaging materials, carrier bags, papers, labels or sheets.

The color effects which can be achieved by means of the cholesteric films or cholesteric pigments of the invention embrace—owing to the host of achievable reflection wave—lengths the UV and IR region as well as, of course, the region of visible light. If the pigments of the invention are applied to or incorporated into banknotes, cheque cards, other cashless means of payment or ID (by means, for example, of known printing techniques), this considerably hinders the identical copying, and especially the counterfeiting, of these articles. The present invention therefore additionally provides for the use of the pigments of the invention for the anticounterfeiting treatment of articles, especially banknotes, cheque cards or other cashless means of payment or ID.

Also provided for by the present invention is the use of the pigments or compositions of the invention for coating articles of utility and for painting vehicles.

The present invention additionally provides coating compositions comprising at least one pigment of the invention, preferably coating compositions selected from effect varnishes, paints or films, and especially from among self-opacifying effect varnishes, paints or films.

The invention is now illustrated in more detail with reference to the following working examples and to attached figures. In those figures, FIG. 1: shows a diagram of a coating apparatus which can be employed in accordance with the invention; and FIG. 2: shows the domain structure of layers according to the invention at a coating overpressure of (A) 0.2 bar and (B) 0.3 bar.

EXAMPLE 1

On the basis of the following test series A to D, the preparation of cholesteric effect layers in accordance with the invention, using a blade coater, is illustrated in more detail.

Test Series A:

Test series A shows the influence of the solids content of the coating composition on the color quality of the cholesteric layer produced.

A cholesteric mixture of the above-described group b) was employed, comprising as chiral monomer a compound of the above formula 2 and as achiral, nematic monomer a mixture of compounds of the above formula 3. The undiluted cholesteric mixture contained 90.5% by weight of the achiral, nematic compound, 6.5% by weight of the chiral compound and, as photoinitiator, 3% by weight of 1-hydroxycyclohexylphenyl ketone, which is sold as Irgacure 184. The solvent used was methyl ethyl ketone.

Coating took place with an apparatus shown diagrammatically in FIG. 1. A lustrous black polyethylene terephthalate film (PET film, G), already coated on its reverse side and having a thickness of 15 $\mu$m, was continuously unrolled from the reel of film (F) and coated with a knife coater. The thickness of the cholesteric layer was 2.5 $\mu$m. Drying took place at 60° C. in the drier (C). The layer was cured by UV fixing in the UV unit (A) while the dried strip was guided over the cooling roll (B). The cured cholesteric layer was wound onto the roller (D).

Table A shows the surprising, advantageous effect of diluting the cholesteric mixture to a concentration (solids content) of 40 to 50%. Column 2 indicates the residence times in the drying area. The meanings of the symbols which characterize the perceived color are as follows:--=very poor, -=poor, o=moderate, +=good, ++=very good.

TABLE A

|  | Concentration (%) | Residence time (sec) | Perceived color | Gloss acc. to DIN 67530 60° angle |
|---|---|---|---|---|
| Comparative Experiment 1a | 70% | 13 | – | 72 |
| Comparative Experiment 1b | 70% | 20 | o | 73 |
| Comparative Experiment 1c | 70% | 40 | o | 75 |
| Comparative Experiment 2a | 60% | 13 | o | 75 |
| Comparative Experiment 2b | 60% | 20 | o | 77 |
| comparative Experiment 2c | 60% | 40 | o | 80 |
| Experiment 1a | 50% | 13 | + | 122 |
| Experiment 1b | 50% | 20 | + | 123 |
| Experiment 1c | 50% | 40 | + | 125 |
| Experiment 2a | 40% | 13 | + | 125 |
| Experiment 2b | 40% | 20 | + | 128 |
| Experiment 2c | 40% | 40 | + | 120 |

Test Series B:

Test series B shows the positive effect of adding minimal amounts of leveling agent.

In this case, the starting point each time was the cholesteric mixture also used in test series A, in a concentration of 45% in methyl ethyl ketone. The drier temperature was 60° C., and the residence time in the drying area 20 seconds. The coating was cured by UV irradiation. Coating was carried out as described for test series A.

TABLE B

|  | % Additives/cholesteric | Percevied color | Gloss acc. to DIN 67530 60° angle |
|---|---|---|---|
| Comparative Experiment | no additions | + | 117 |
| Experiment 1a | 0.01% Byk 361 | ++ | 149 |
| Experiment 1b | 0.10% Byk 361 | ++ | 146 |
| Experiment 1c | 0.50% Byk 361 | ++ | 119 |
| Experiment 2a | 0.01% Tego flow ZFS 460 | ++ | 147 |
| Experiment 2b | 0.10% Tego flow ZFS 460 | ++ | 132 |
| Experiment 2c | 0.50% Tego flow ZFS 460 | ++ | 136 |

Test Series C:

Test series C shows the positive effect on the smoothness of the resulting cholesteric layers of carrying out coating with an overpressure.

In this case, the starting point each time was the cholesteric mixture also used in test series A, in a concentration of 45% in methyl ethyl ketone. The drier temperature was 60° C., and the residence time in the drying area 20 seconds. The coating was cured by UV irradiation. Coating was carried out as described for test series A. The thickness of the cholesteric layer was 2.5 $\mu$m.

Table C1 shows that an increased coater overpressure, especially when a leveling agent is added as described in test series B, leads to a markedly reduced roughness of the cast and cured layer. The roughness was measured mechanically using a FEINPRÜF Pertometer (test section: 5.6 mm; cut-off: 0.25 mm). Rz is the averaged roughness depth in accordance with DIN 4768, Ra the mean roughness value in accordance with DIN 4768/1. The surface quality is already at a high level in Experiment 1b and leads to excellent brilliance. Further improvements in the surface properties can no longer be measured by the optical method of DIN 67530—hence the identical values in column 6 for Experiments 1b and 1c—and require demonstration by other methods.

Table C2 shows the results of measuring the three layers indicated in Table C1 by means of scanning atomic force microscopy (SAFM). The surfaces of the LC layers, depending on quality, are covered in a manner of a network by a domainlike structure. The higher the surface quality, the larger the domain areas (domain diameters). At the same time, the microgrooves delimiting the domains are substantially shallower.

TABLE C1

|  | Additives | Coater over-pressure | Roughness Rz | Roughness Ra | Gloss acc. to DIN 67530 60° angle |
|---|---|---|---|---|---|
| Experiment 1a | none | 0.02 bar | 200 nm | 30 nm | 117 |
| Experiment 1b | 0.1% Byk361 | 0.02 bar | 102 nm | 16 nm | 146 |
| Experiment 1c | 0.1% Byk361 | 0.2 bar | 59 nm | 10 nm | 146 |

TABLE C2

| | Additives | Coater over-pressure | Domain diameter (mm) | Microstructure/ groove depth (nm) |
|---|---|---|---|---|
| Experiment 1a | none | 0.02 bar | approx. 10 | 50–100 |
| Experiment 1b | 0.1% Byk361 | 0.02 bar | approx. 20 | 30–50 |
| Experiment 1c | 0.1% Byk361 | 0.2 bar | approx. 25 | 5–10 |

Test Series D:

Test series D shows the positive effect of coating with overpressure on the smoothness of the cholesteric layers produced.

The tests were conducted with the cholesteric mixture employed in test series A in a concentration of 45% in methyl ethyl ketone. Byk361 in a concentration of 0.1% was added as leveling agent. The cholesteric mixture was applied to a carrier film as described for test series A. The drier temperature was 60° C., the residence time in the drying chamber 20 seconds. The coated and dried films were subjected to further treatment as described in test series A. The thickness of the dried and crosslinked cholesteric layer was 3.4 µm. Table D shows the experimental results. Domain diameters and the depth of the microgrooves delimiting the domains were measured as in test series C.

TABLE D

| | Coating rate (m/min) | Coating over-pressure (bar) | Coating gap (µm) | Domain diameter (µm) | Microstructure groove depth (nm) |
|---|---|---|---|---|---|
| Experiment 1a | 5 | 0.2 | 12 | about 30–50 | 5–10 |
| Experiment 1b | 10 | 0.3 | 10 | No domain structure still perceptible | ≦5 |

Figure 2A:
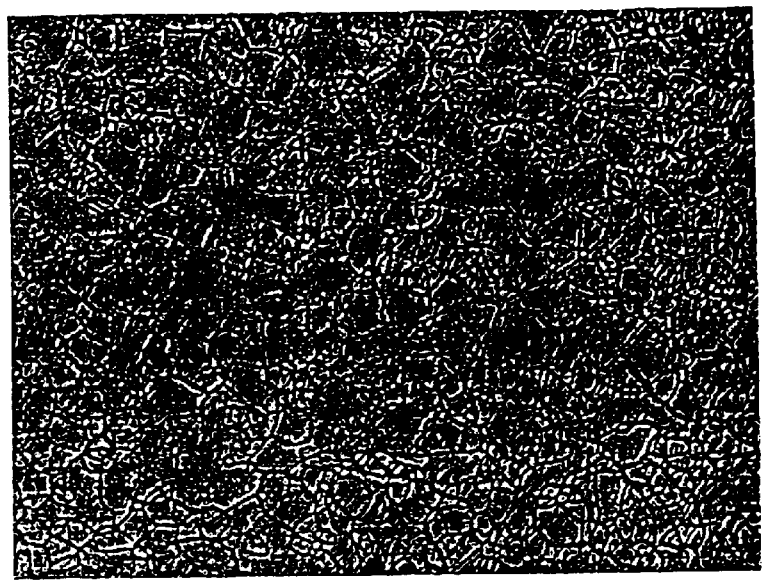
Figure 2B:
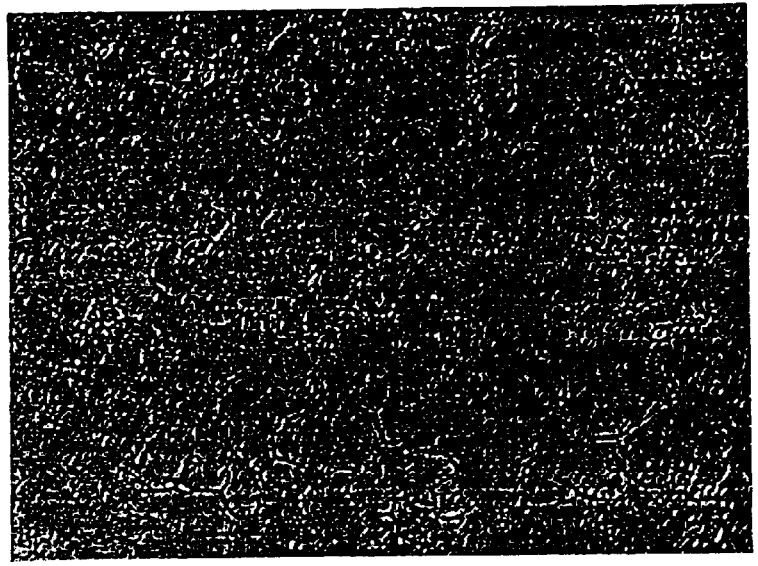

FIGS. 2A and 2B illustrate clearly the effect documented in Table D. The coating prepared with a coater overpressure of 0.2 bar, which is shown in FIG. 2A, exhibits a distinctly perceptible domain structure. In contrast, the coating prepared with a coater overpressure of 0.3 bar and shown in FIG. 2B is substantially smoother, so that the domain structure is predominantly resolved and only isolated grooves can still be seen.

The test results observed are surprising insofar as the layer quality can be improved further with increasing coating rate despite the fact that the remaining orientation time (time until entry into the drying phase) for the cholesteric helices is reduced. Furthermore, an increase in the coating rate permits a more economic production rate, that is, a higher production rate.

The cholesteric layers prepared in Example 1 can be removed in customary manner from the carrier film and milled, for example, to give effect pigments. A further possibility is to use the coated film webs as such, for example, as effect films. To improve the adhesion of the cholesteric layer to the carrier film it may be advantageous in this case to raise the drying temperature and/or extend the drying time. On the basis of the detailed instructions in the present description, the skilled worker is enabled without undue burden to optimize the coating conditions in accordance with the respective intended use of the product.

EXAMPLE 2

Preparing a Transparent Green-Blue Color effect film

A solution is prepared which consists of 20 parts of cholesteric mixture (96.2% nematic component of the formula (3) and 3.8% chiral component of the formula (5)) with a reflection maximum at 510 nm, 3 parts of photoinitiator Irgacure® 907 (from Ciba-Geigy), 0.1 part of Byk 361 (from Byk) and 76.9 parts of methyl ethyl ketone. A coating machine is used to apply the solution to a 480 mm wide polyester film. Coating takes place by means of a stainless steel roll which at the bottom dips into a trough containing the solution. By rotation of the roll, the surface of the roll is wetted continually with a liquid film. Run continuously past the top of the roll is a film which is in direct contact with the roll. The direction of rotation of the roll is counter to the direction of movement of the film (reverse roll coating). In this way, a thin liquid film of the solution is applied to the film, and is subsequently subjected to physical drying at 60° C. in a drying tunnel. Directly thereafter, the physically dried cholesteric layer is cured in-line by irradiation with UV light under a nitrogen atmosphere (chemically dried). The layer thickness of the coating is 2 µm. This gives a transparent color effect film having a reflection maximum of 528 nm and a reflection of 30%. Viewed with the eye, the film is transparent with a moderate but bright color change from green (when viewed straight on) to blue (when viewed at an angle).

EXAMPLE 3

Preparing a Transparent Red-green Color Effect Film

A solution is prepared which consists of 20 parts of cholesteric mixture (97.35% nematic component of the formula (3) and 2.65% chiral component of the formula (5)) with a reflection maximum at 664 nm, 3 parts of photoinitiator Irgacure® 907 (from Ciba-Geigy), 0.1 part of Byk 361 (from Byk) and 76.9 parts of methyl ethyl ketone. A coating machine is used to apply the solution to a 480 mm wide polyester film. Coating takes place as in Example 2. The layer thickness of the coating is 2 µm. This gives a transparent color effect film having a reflection maximum of 655 nm and a reflection of 23%. Viewed with the eye, the film is transparent with a moderate but bright color change from red (when viewed straight on) to green (when viewed at an angle).

EXAMPLE 4

Preparing a Transparent Blue-violet Color Effect Film

A solution is prepared which consists of 20 parts of cholesteric mixture (96.38% nematic component of the formula (3) and 3.62% chiral component of the formula (5)) with a reflection maximum at 483 nm, 3 parts of photoinitiator Irgacure® 907 (from Ciba-Geigy), 0.1 part of Byk 361

(from Byk) and 76.9 parts of methyl ethyl ketone. A coating machine is used to apply the solution to a 480 mm wide polyester film. Coating takes place as in Example 2. The layer thickness of the coating is 2 µm. This gives a transparent color effect film having a reflection maximum of 487 nm and a reflection of 40%. Viewed with the eye, the film is transparent with a moderate but bright color change from blue (when viewed straight on) to violet (when viewed at an angle).

EXAMPLE 5

Preparing an Opaque Green-blue Color Effect Film

A film prepared as described in Example 2 is coated with a solution consisting of 25 parts of black printing ink Flexoplastol VA/2-black (from BASF AG) and 75 parts of ethanol. Coating is as described in Example 2 but without UV curing (only physical drying). The thickness of the black layer is 1 µm. Coating with the black printing ink takes place on the cholesteric-coated side of the film prepared in accordance with Example 2. This gives an opaque color effect film which shows color on one side and is black on the other side. If the film is viewed from the colored side, the colored layer is seen through the polyester film; that is, the outside of the color effect film is protected by the polyester film. Consequently, on the outside the color effect film has the same good properties with regard, for example, to scratch resistance and chemical resistance as a pure polyester film. Viewed with the eye, the film is opaque with a strong and bright color change from green (when viewed straight on) to blue (when viewed at an angle).

EXAMPLE 6

Preparing an Opaque Red-green Color Effect film

A film prepared as described in Example 3 is coated with a solution consisting of 25 parts of black printing ink Flexoplastol VA/2-black (from BASF AG) and 75 parts of ethanol. Coating is as described in Example 3 but without UV curing (only physical drying). The thickness of the black layer is 1 µm. Coating with the black printing ink takes place on the cholesteric-coated side of the film prepared in accordance with Example 3.

This gives an opaque color effect film which shows color on one side and is black on the other side. If the film is viewed from the colored side, the colored layer is seen through the polyester film; that is, the outside of the color effect film is protected by the polyester film. Consequently, on the outside the color effect film has the same good properties with regard, for example, to scratch resistance and chemical resistance as a pure polyester film. Viewed with the eye, the film is opaque with a strong and bright color change from red (when viewed straight on) to green (when viewed at an angle).

EXAMPLE 7

Preparing an Opaque Blue-violet Color Effect Film

A film prepared as described in Example 4 is coated with a solution consisting of 25 parts of black printing ink Flexoplastol VA/2-black (from BASF AG) and 75 parts of ethanol. Coating is as described in Example 4 but without UV curing (only physical drying). The thickness of the black layer is 1 µm. Coating with the black printing ink takes place on the cholesteric-coated side of the film prepared in accordance with Example 4.

This gives an opaque color effect film which shows color on one side and is black on the other side. If the film is viewed from the colored side, the colored layer is seen through the polyester film; that is, the outside of the color effect film is protected by the polyester film. Consequently, on the outside the color effect film has the same good properties with regard, for example, to scratch resistance and chemical resistance as a pure polyester film. Viewed with the eye, the film is opaque with a strong and bright color change from blue (when viewed straight on) to violet (when viewed at an angle).

EXAMPLE 8

Preparing a Transparent Green-violet Color Effect Film Having a Cholesteric Double Layer A film prepared as described in Example 3 is coated as described in Example 4 with a 2nd cholesteric layer. In this arrangement, the 2nd cholesteric layer is applied to the 1st cholesteric layer.

This gives a transparent color effect film having two reflection maxima, one at 486 nm and the other at 640 nm. At 486 nm the reflection is 36%, at 640 nm 21%. Viewed with the eye, the film is transparent with a moderate but bright color change from green (when viewed straight on) to red-violet (when viewed at an angle).

EXAMPLE 9

Preparing an Opaque Green-violet Color Effect Film

A film prepared as described in Example 8 is coated with a solution consisting of 25 parts of black printing ink Flexoplastol VA/2-black (from BASF AG) and 75 parts of ethanol. Coating is as described in Example 2 but without UV curing (only physical drying). The thickness of the black layer is 1 µm. Coating with the black printing ink takes place on the cholesteric-coated side of the film prepared in accordance with Example 8.

This gives an opaque color effect film which shows color on one side and is black on the other side. If the film is viewed from the colored side, the colored layer is seen through the polyester film; that is, the outside of the color effect film is protected by the polyester film. Consequently, on the outside the color effect film has the same good properties with regard, for example, to scratch resistance and chemical resistance as a pure polyester film. Viewed with the eye, the film is opaque with a strong and bright color change from green (when viewed straight on) to red-violet (when viewed at an angle).

EXAMPLE 10

Preparing Cholesteric Three-layer Pigments a) Preparing the 1st Cholesteric Layer Using a coating apparatus as in Example 1, a solution consisting of 45 parts of cholesteric mixture (96.2% nematic component of formula (3) and 3.8% chiral component of formula (5)), 3 parts of photoinitiator Irgacure® 907 (from Ciba-Geigy), 0.1 part of Byk 361 (from Byk) and 51.9 parts of methyl ethyl ketone is applied to a polyester film. The coated film is then passed through a drying tunnel which is thermostatted at 60° C. Subsequently, the physically dried layer is cured in-line by irradiation with UV light under a nitrogen atmosphere and the coated film is wound up onto a spool. The cholesteric layer has a thickness of 2 µm and, perpendicularly to the plane of the layer, reflects light with a reflection maximum at a wavelength of 505 nm. Viewed with the eye, the layer appears green when viewed straight on with a color change to blue when the layer is viewed at an angle.

b) Preparing the Interlayer

The film coated as described under a) is coated with the aid of the same coating apparatus with a solution consisting of 70.82 parts of black printing ink Flexoplastol VA/2-black (from BASF AG), 7.08 parts of reactive diluent (triacrylate of propoxylated/ethoxylated trimethylolpropane; Laromer® PO 33F; from BASf AG), 0.85 part of photoinitiator Irgacure® 500 (from Ciba-Geigy), and 21.25 parts of tetrahydrofuran. The coated film is then passed through a drying tunnel which is thermostatted at 60° C., and is physically dried. Subsequently, the layer is cured in-line by irradiation with UV light under a nitrogen atmosphere and the coated film is wound up onto a spool. The black-layer has a thickness of 1 µm.

c) Preparing the 2nd Cholesteric Layer

The film coated as described under a) and b) is coated with the aid of the same coating apparatus with a solution consisting of 45 parts of cholesteric mixture (cf. step a), 3 parts of photoinitiator Irgacure 907, 0.1 part of Byk 361 and 51.9 parts of methyl ethyl ketone. The coated film is then passed through a drying tunnel which is thermostatted at 60° C., and is physically dried. Subsequently, the layer is cured in-line by irradiation with UV light under a nitrogen atmosphere and the coated film is wound up onto a spool. The cholesteric layer has a thickness of 2 µm and, perpendicularly to the plane of the layer, reflects light with a reflection maximum at 510 nm. Viewed with the eye, the layer appears green when viewed straight on with a color change to blue when the layer is viewed at an angle.

In accordance with operating steps a), b) and c) a three-layer assembly is obtained on the polyester carrier film. The mechanical stability of the three-layer assembly was determined by measuring the tear strength and the peel force. For this purpose, the films coated with the three-layer assembly are cut into 3.81 mm wide strips, the force pickup is bonded adhesively to the three-layer assembly and the force required to tear (tear strength) or to remove (peel force) the torn layer is measured. The tear strength between the 1st cholesteric layer and the black interlayer is 0.065 N and the peel force is 0.005 N.

d) Removing the Three-layer Assembly from the Carrier Film

The three-layer assembly as described under a), b) and c) is removed from the polyester carrier film by damaging the three-layer assembly transversely to the film web direction using a razorblade and then blowing it off with compressed air which is injected through a slot die. The coated film is guided continuously past the slot die and the three-layer assembly blown off is collected in the form of flakes. The three-layer flakes are 6 µm thick and when viewed straight on show a vigorous green color on both sides with a color change to blue when the flakes are viewed at an angle.

e) Grinding the Three-layer Flakes to give a Pigment 10 g of cholesteric flakes prepared as described under d) are mixed with 100 g of sodium chloride and the mixture is ground in a beater-blade mill 6 times for 2 minutes. After grinding, the salt is washed out with water and the pigment is isolated. In the course of grinding, there is partial delamination of the three-layer pigment.

EXAMPLE 11

Preparing Cholesteric Three-layer Pigments a) First of all, the 1st Cholesteric Layer is Prepared as Described in Example 10 Under a).

b) Preparing the Interlayer

The film coated as described under a) is coated with the aid of the same coating apparatus with a solution consisting of 28.33 parts of black printing ink Flexoplast VA/2-black (from BASF AG), 2.83 parts of Laromer® PO 33F (from BASF AG), 0.34 part of photoinitiator Irgacure 500 (from Ciba-Geigy), 60 parts of 20 percent strength solution of a copolymer of ethylhexyl acrylate and acrylic acid (Acronal® 101 L from BASF AG) in tetrahydrofuran and 8.5 part of tetrahydrofuran. The coated film is then passed through a drying tunnel which is thermostatted at 60° C., and is physically dried. Subsequently, the layer is cured in-line by irradiation with UV light under a nitrogen atmosphere and the coated film is wound up onto a spool. The black layer has a thickness of 1 µm.

c) Preparing the 2nd Cholesteric Layer

The 2nd cholesteric layer is applied as described in Example 10 under c) to the black interlayer, to give a three-layer assembly. The mechanical stability of the three-layer assembly when tested gives a tear strength between the 1st cholesteric layer and the black interlayer of 0.19 N and a peel force of 0.01 N.

d) Removing the Three-layer Assembly from the Carrier Film

The three-layer assembly is removed from the carrier film as described in Example 10 under d).

e) Grinding the Three-layer Flakes to Form a Pigment

Grinding to form a pigment takes place as described in Example 10 under e). Microscopic assessment shows a markedly lower proportion of delaminated pigment particles in comparison to Example 10, these particles being 6 µm thick and showing a strong green color on both sides when viewed straight on. If the angle of viewing is altered, the result is a color change from green to blue. When viewed against a white background, the pigment particles are opaque.

EXAMPLE 12

Preparing Three-layer Pigments with a Pigmented Absorber Layer Comprising a Cholesteric, Radiation-curable Binder a) Preparing the 1st Cholesteric Layer First of all, a 2 µm (dry thickness) cholesteric layer is cast on to a 15 µm PET carrier film in accordance with the procedure described in Example 1, test series A, and said cholesteric layer is UV-cured. The reflection maximum of this layer was 520 nm.

b) Preparing an Absorber Layer Pigmented with Carbon Black Pigment and Comprising Cholesteric Binder In a laboratory kneading apparatus with a useful volume of 300 ml, 150 g of pigment-grade carbon black Regal 400R (manufacturer: Cabot Corporation) are kneaded with 3 g of stearic acid, 80 g of a phosphonate-functional dispersing resin, 50% strength in tetrahydrofuran, as described in DE-A-195 16 784, and 40 g of methyl ethyl ketone for 1 hour. The resulting kneaded mass (solids content 70.7%) is then adjusted to a solids content of 25% using 499 g of methyl ethyl ketone, in a dissolver. This dispersion is subsequently dispersed to its optimum in a stirred mill (type Dispermat SL, milling chamber volume 125 ml, grinding media zirconium oxide 1–1.25 mm). The progress of dispersion is monitored by means of an interference contrast technique (EP-B-0 032 710). The ultimate fineness is attained when the surface to be tested is free from agglomerates. A layer prepared from this composition is highly glossy and has a base roughness of $\leq 100$ nm. 500 g of a 60% strength cholesteric solution are mixed intensively into the resultant dispersion together with 0.3 g of Byk 361 (Byk-Chemie) for 30 minutes using a dissolver. Following the incorporation, with stirring, of 9 g of photoinitiator Irgacure 907 (Ciba Geigy), this dispersion (solids content 39.2%) can be applied. For this purpose it is applied in a layer thickness of 0.8 $\mu$m (dry thickness) to the 1st cholesteric layer in analogy to step a), and is dried physically and then radiation-cured under a nitrogen atmosphere.

c) Preparing the 2nd Cholesteric Layer

A further cholesteric layer is applied in analogy to step a) to the cured absorber layer, and said cholesteric layer is dried and cured. In terms of its composition and layer thickness, the 2nd cholesteric layer is comparable with the 1st cholesteric layer.

d) Preparing Pigments

As described in Example 11, the cured three-layer assembly is separated from the substrate and ground. This gives pigments having high brightness on both sides with a color which is dependent on the viewing angle.

We claim:

1. A process for producing a cholesteric layer that comprises:
    applying at least one layer of a curable, pourable cholesteric mixture to a substrate and forming a solid cholesteric layer,
    wherein said solid cholesteric layer has a mean fluctuation in layer thickness of less than ±0.2 $\mu$m.

2. The process of claim 1, wherein said curable, pourable cholesteric mixture comprises a diluent fraction comprising from about 5 to 95% of the weight of the mixture.

3. The process of claim 1, wherein said curable, pourable cholesteric mixture is selected from the group consisting of mixtures comprising:
    (a) at least one cholesteric, polymerizable monomer in an inert diluent,
    (b) at least one achiral, nematic, polymerizable monomer and one chiral compound in an inert diluent,
    (c) at least one cholesteric, crosslinkable oligomer or polymer in an inert diluent,
    (d) a cholesteric polymer in a polymerizable diluent, and
    (e) at least one cholesteric polymer whose cholesteric phase can be frozen in by rapid cooling to below the glass transition temperature.

4. The process of claim 1, wherein the curable, pourable cholesteric mixture has a viscosity in the range from about 10 to 500 mPas, measured at 23° C.

5. The process of claim 1, wherein the cholesteric mixture is applied to the substrate at a rate in the range from about 1 to 800 m/min.

6. The process of claim 1, wherein the mixture is applied to the substrate by means of a casting apparatus selected from a reverse roll coater, a kiss coater, a cast-film extruded, a bar coater or a knife coater.

7. The process of claim 1, wherein the mixture applied to the substrate is dried and subsequently or alternatively is cured by means of heat, UV or electron beams.

8. The process of claim 1,
    wherein the substrate is coated with at least one further cholesteric mixture of the same or different composition; or
    wherein the substrate is coated, before, after or between the application of the cholesteric layer(s), with at least one further layer selected from a release layer, a layer which absorbs transmitted light, an adhesive layer, stabilizer layer, support layer, protective layer or cover layer.

9. The process of claim 1, wherein the fully cured layer structure which is applied to the substrate is removed therefrom and, optionally, is comminuted to form a pigment.

10. A cholesteric material comprising at least one cholesteric layer that has a mean fluctuation in layer thickness of less than ±0.2 $\mu$m.

11. The cholesteric material of claim 10, wherein the cholesteric layer has a mean dry layer thickness ranging from about 0.5 to 20 $\mu$m.

12. The cholesteric material of claim 10 that is in web form or in sheet form.

13. A single- or multilayered pigment obtained by comminuting the cholesteric material of claim 10.

14. A pigment obtained by comminuting a material produced by the process of claim 1.

15. The multilayer pigment of claim 13 that comprises at least two cholesteric layers between which there is a layer that absorbs all or some transmitted light.

16. The multilayer pigment of claim 15 that comprises at least two cholesteric layers between which there is a layer which absorbs all or some transmitted light.

17. The multilayer pigment of claim 16 that comprises at least two cholesteric layers between which there is a layer which absorbs all or some transmitted light.

18. The multilayer pigment of claim 15, wherein the absorbing layer comprises a binder matrix based on a cholesteric mixture selected from the group consisting of mixtures comprising:
    (a) at least one cholesteric, polymerizable monomer in an inert diluent,
    (b) at least one achiral, nematic, polymerizable monomer and one chiral compound in an inert diluent,
    (c) at least one cholesteric, crosslinkable oligomer or polymer in an inert diluent,
    (d) a cholesteric polymer in a polymerizable diluent, and
    (e) at least one cholesteric polymer whose cholesteric phase can be frozen in by rapid cooling to below the glass transition temperature.

19. The multilayer pigment of claim 16, wherein the absorbing layer comprises a binder matrix based on a cholesteric mixture selected from the group consisting of mixtures comprising:

(a) at least one cholesteric, polymerizable monomer in an inert diluent, (b) at least one achiral, nematic, polymerizable monomer and one chiral compound in an inert diluent, (c) at least one cholesteric, crosslinkable oligomer or polymer in an inert diluent, (d) a cholesteric polymer in a polymerizable diluent, and (e) at least one cholesteric polymer whose cholesteric phase can be frozen in by rapid cooling to below the glass transition temperature.

20. The multilayer pigment of claim 15, wherein the layer that absorbs is also magnetic.

21. The multilayer pigment of claim 16, wherein the layer which absorbs is also magnetic.

22. A composition comprising at least one single- or multilayer pigment of claim 13.

23. A product or composition comprising a cholesteric material comprising at least one cholesteric layer that has a mean fluctuation in layer thickness of less than ±0.2 $\mu$m.

24. The product or composition of claim 23, further comprising one or more substances selected from the group consisting of a water-borne coating, a powder coating, a solvent-borne coating and a solvent-free coating.

25. A cholesteric effect layer comprising the cholesteric material of claim 10.

26. A color effect film comprising the cholesteric material of claim 10.

27. A cholesteric three-layer pigment comprising the cholesteric material of claim 10.

28. A product or composition comprising a cholesteric material produced by the process of claim 1.

29. A product or composition comprising a cholesteric material produced by the process of claim 2.

* * * * *